US010838466B2

(12) United States Patent
Rittenhouse et al.

(10) Patent No.: US 10,838,466 B2
(45) Date of Patent: Nov. 17, 2020

(54) RADIATIVE HINGE

(71) Applicant: Intel Corporation, Santa Clara, CA (US)

(72) Inventors: David A. Rittenhouse, Fair Oaks, CA (US); Manish A. Hiranandani, Fremont, CA (US); Denica N. Larsen, Portland, OR (US); Anand S. Konanur, San Jose, CA (US); Hong W. Wong, Portland, OR (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 15/775,143

(22) PCT Filed: Dec. 10, 2015

(86) PCT No.: PCT/US2015/064874
§ 371 (c)(1),
(2) Date: May 10, 2018

(87) PCT Pub. No.: WO2017/099774
PCT Pub. Date: Jun. 15, 2017

(65) Prior Publication Data
US 2018/0348825 A1 Dec. 6, 2018

(51) Int. Cl.
G06F 1/16 (2006.01)
G06F 1/20 (2006.01)
(52) U.S. Cl.
CPC ............ G06F 1/1681 (2013.01); G06F 1/203 (2013.01)

(58) Field of Classification Search
CPC ........ G06F 1/1637; G06F 1/1681; G06F 1/16; G06F 1/1613; G06F 1/1633; G06F 1/1684; G06F 1/181; G06F 1/203
See application file for complete search history.

(56) References Cited

U.S. PATENT DOCUMENTS

| 2002/0113741 | A1* | 8/2002 | Asano | G06F 1/1616 343/702 |
| 2007/0194994 | A1* | 8/2007 | Waltho | H01Q 1/2258 343/702 |
| 2008/0231522 | A1 | 9/2008 | Montgomery et al. | |
| 2012/0007783 | A1* | 1/2012 | Taura | H01Q 1/2266 343/702 |
| 2013/0321216 | A1 | 12/2013 | Jervis et al. | |
| 2015/0200443 | A1 | 7/2015 | Lo et al. | |
| 2015/0255852 | A1 | 9/2015 | Pan et al. | |
| 2017/0257146 | A1* | 9/2017 | Szeto | H02J 50/10 |

(Continued)

FOREIGN PATENT DOCUMENTS

WO 2004049502 A1 6/2004

OTHER PUBLICATIONS

International Preliminary Report on Patentability issued in PCT Application No. PCT/US2015/064874 dated Jun. 21, 2018; 12 pages.

(Continued)

Primary Examiner — Anthony Q Edwards
(74) Attorney, Agent, or Firm — Patent Capital Group

(57) ABSTRACT

Particular embodiments described herein provide for device that includes a first housing, a second housing, and a hinge, configured as an antenna, to rotatably couple the first housing and the second housing.

20 Claims, 26 Drawing Sheets

(56) References Cited

U.S. PATENT DOCUMENTS

2018/0210499 A1\* 7/2018 Tsubaki ................ G06F 1/1616
2018/0246546 A1\* 8/2018 Ghosh ....................... G06F 1/16
2018/0287241 A1\* 10/2018 Kumar ................. H01Q 1/2266

OTHER PUBLICATIONS

International Search Report and Written Opinion issued in PCT Application No. PCT/US2015/064874 dated Sep. 6, 2016; 14 pages.

\* cited by examiner

US 10,838,466 B2

RADIATIVE HINGE

CROSS-REFERENCE TO RELATED APPLICATIONS

This application is a national stage application under 35 U.S.C. § 371 of PCT International Application Serial No. PCT/US2015/064874, filed on Dec. 10, 2015 and entitled "RADIATIVE HINGE," which is hereby incorporated by reference in its entirety.

TECHNICAL FIELD

This disclosure relates in general to the field of electronic devices, and more particularly, to a radiative hinge for an electronic device.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
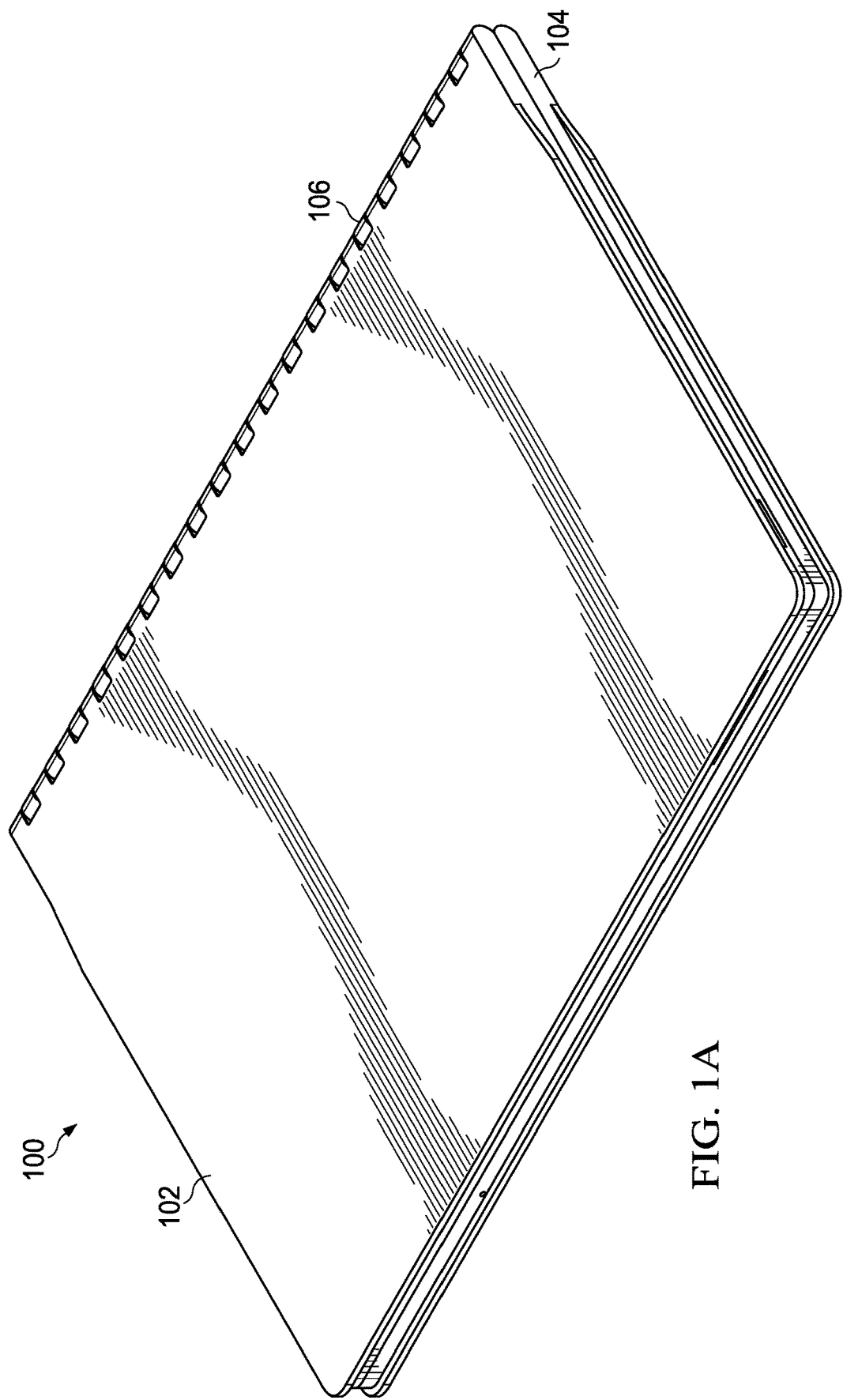
FIG. 1A is a simplified schematic diagram illustrating an orthographic view of an embodiment of an electronic device, in accordance with one embodiment of the present disclosure.

FIG. 1A is a simplified block diagram orthographic view illustrating an embodiment of an electronic device 100 is a closed clamshell configuration, in accordance with one embodiment of the present disclosure. Electronic device 100 can include a first housing 102, a second housing 104, and a hinge 106. Hinge 106 can be configured to rotatably couple first housing 102 and second housing 104. Hinge 106 can be configured as a radiative hinge to allow hinge 106 to function as an antenna for a wireless device or module.

Figure 1B:
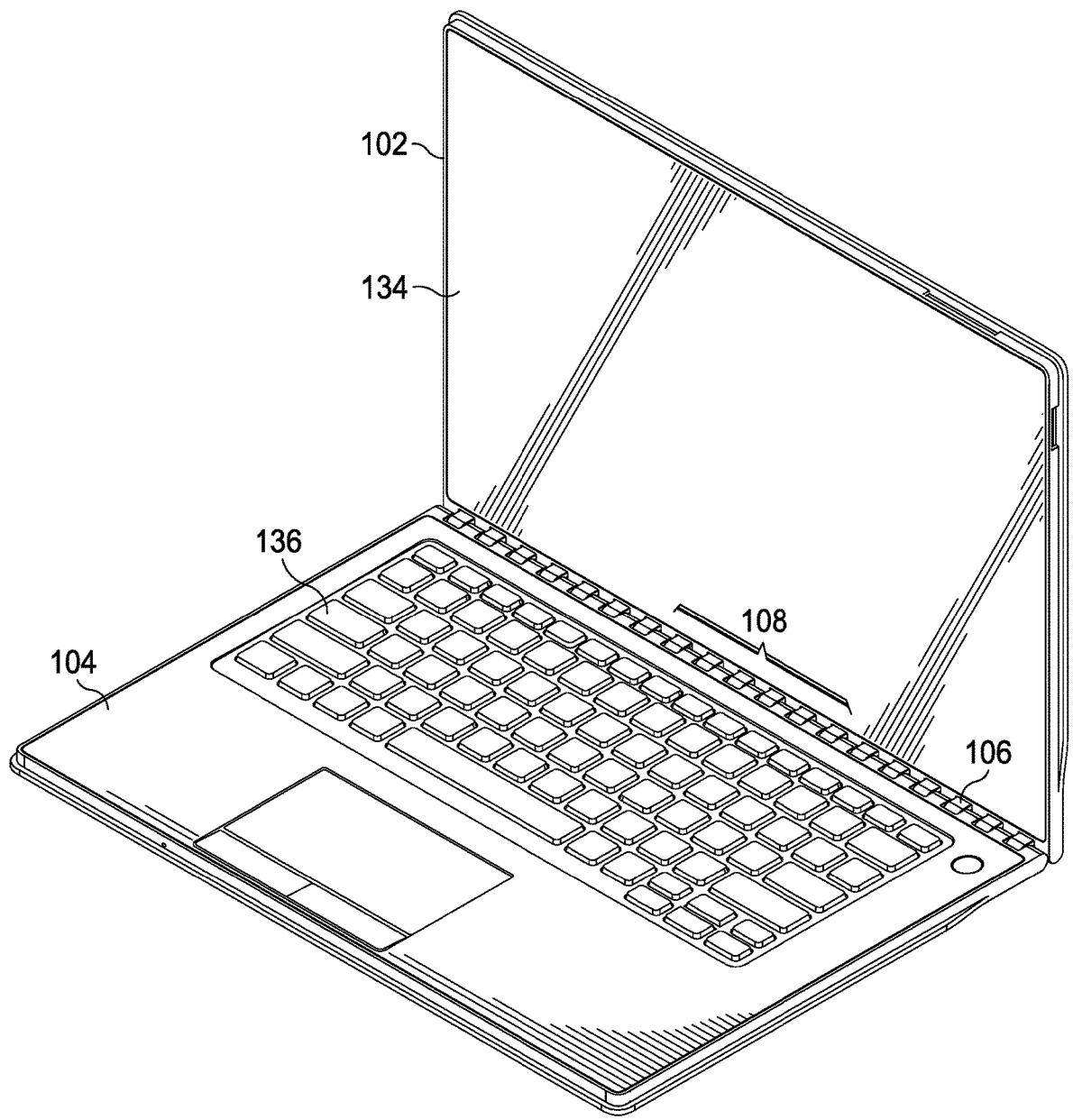
FIG. 1B is a simplified schematic diagram illustrating an orthographic view of an embodiment of an electronic device, in accordance with one embodiment of the present disclosure.

Turning to FIG. 1B, FIG. 1B is a simplified block diagram orthographic view illustrating an embodiment of an electronic device 100 is an open clamshell configuration, in accordance with one embodiment of the present disclosure. As illustrated in FIG. 1B, first housing 102 has been tilted or rotated away from second housing using hinge 106. Hinge 106 can include an antenna 108. First housing 102 can include a display 134 and second housing 104 can include a keyboard 136 (e.g., a physical keyboard or a virtual keyboard).

For purposes of illustrating certain example features of electronic device 100, the following foundational information may be viewed as a basis from which the present disclosure may be properly explained. As laptops and other hinged electronic devices continue to evolve, traditional clamshell laptops have become thinner with the trend towards extremely thin or nonexistent bezels, the space in the display bezel that traditionally housed antennas is fast vanishing in current designs. Coupled with the increased use of all metal aluminum, magnesium alloy covers, the system designers of electronic devices often have large metallic surfaces and components available in the chassis but no obvious way to repurpose some of them as antennas through proper excitation. What is needed is a system and method to reuse or repurpose chassis components, such as the hinge, as antennas.

An electronic device design as outlined in FIGS. 1A and 1B, can resolve these issues (and others). Electronic device 100 can be configured to allow or enable disruptive form factors based on an all metallic chassis design through the use of a micro hinge as an antenna coupling element. The design of the hinge section and the associated housings (e.g., first housing 102 and second housing 104) can incorporate key inputs on dimensions, spacing between adjacent hinge sections, and spacing between the housings so that the structure can behave as an efficient radiator for a chosen frequency band. In an example, connectors can be constructed or fashioned as part of the hinge mechanical design to allow for a micro-coax cable or other electrical interconnection from electrical components (e.g., system on a chip (SoC), wireless module, etc.) of the electronic device to be directly connected into the hinge.

Electronic device 100 can be a naturally electric, relatively large structure. In one or more embodiments, electronic device 100 is a notebook computer or laptop computer. In still other embodiments, electronic device 100 may be any suitable electronic device having a hinge such as a hinged mobile device, a hinged personal digital assistant (PDA), a hinged smartphone, a hinged audio system, a hinged movie player of any type, a hinged computer docking station, etc.

Using hinge 106 to house or as antenna 108 can help in lowering the specific absorption rate which is an indicator of biological tissue heating due to an EM field from the antenna placed near a user or less than twenty centimeters (<20 cm) from the user. Compared to miniaturized antennas that seek to use high dielectric material or very highly meandered traces, hinge 106 can be covered with free space (i.e., air) and is electrically large. This has the effect of keeping the peak electric field low and hence limiting SAR.

Most current implementations of antennas in metallic chassis, require cutouts in multiple covers. For example, if a closed lid operation is desired, then cutouts for current implementations of antennas are typically required on the inside and outside of both a display housing and a keyboard housing. The use of hinge 106 as a housing for antenna 108 allows for much thinner hinges. Electronic device 100 can be configured to allow for larger batteries and for radiation even as the angle between first housing 102 and second housing 104 is changed. This includes closed lid configurations, something traditional antenna placement cannot provide without matching cutouts on the four exposed surfaces of a display housing and a keyboard housing. In an example, the radiation pattern itself can change as the lid is closed.

Figure 2:
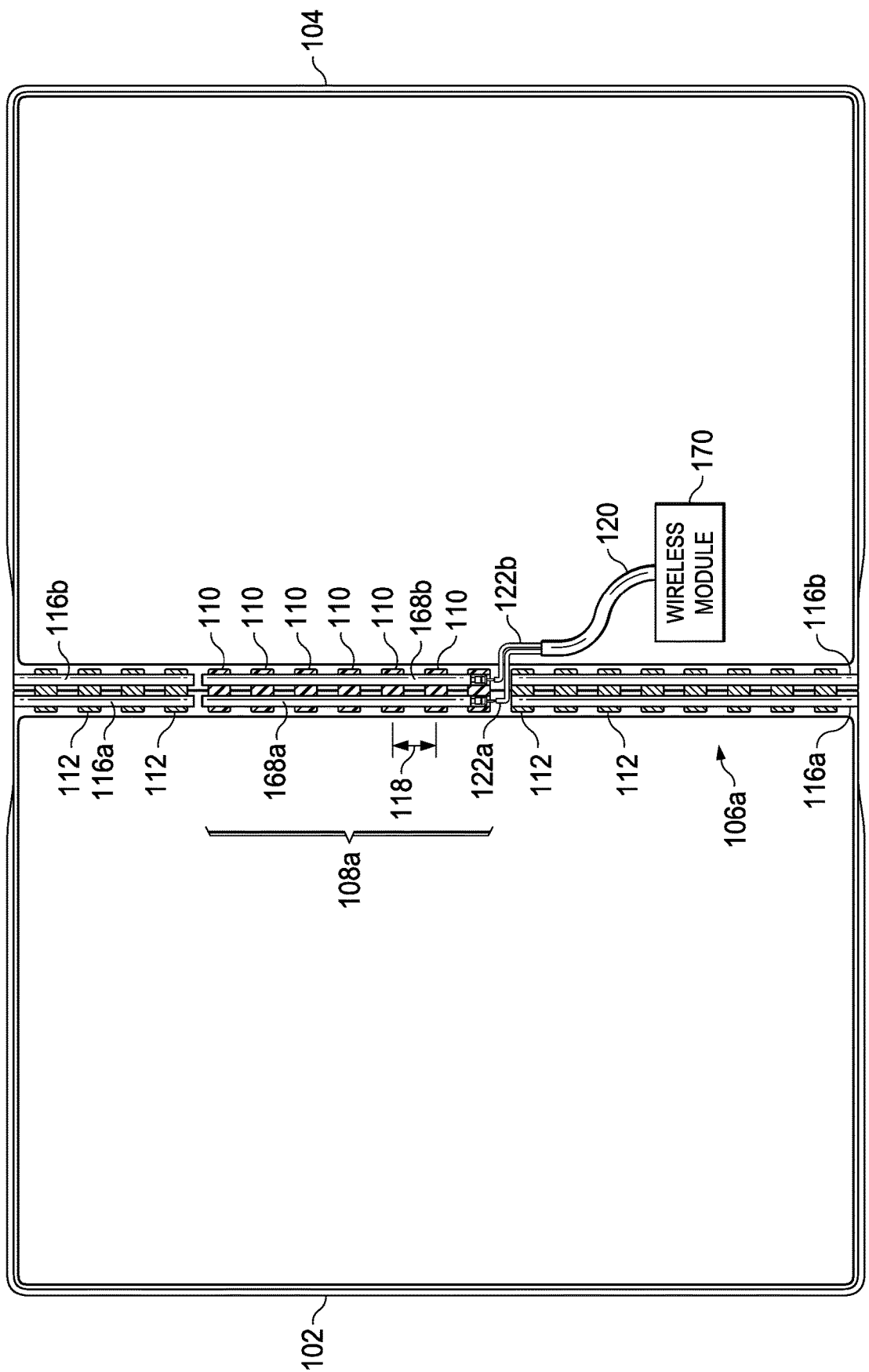
FIG. 2 is a simplified block diagram view of an embodiment of an electronic device, in accordance with one embodiment of the present disclosure.

Turning to FIG. 2, FIG. 2 is a simplified block diagram view of an embodiment of an electronic device, in accordance with one embodiment of the present disclosure. Hinge 106a can include antenna 108a, non-metallic links 110, metallic links 112, and hinge rods 116a and 116b. In an example, hinge rods 116a and 116b can run the length of hinge 106 and can be used as feeding points for conductors 122a and 122b. Conductors 122a and 122b can be part of a portion of a coax cable 120 and can make up at least a portion of antenna 108a. Coax cable 120 can be coupled to wireless module 170.

In another example, as illustrated in FIG. 2, hinge rods 116a and 116b can run a portion of the length of hinge 106a and antenna facilitating rods 168a and 168b can run the length of antenna 108a. Conductor 122a can be inserted into antenna facilitating rod 168a and conductor 122b can be inserted into antenna facilitating rod 168b. The length of each antenna facilitating rod 168a and 168b, gap 118 (or the distance between non-metallic links 110), and the number of non-metallic links 110 can be varied to allow for a wide degree of freedom in the design and configuration of hinge 106a and antenna 108a. In addition gap 118 can be varied to tune the resonant frequency and bandwidth of antenna 108a in the hinge 106a. The length of conductor 122a and 122b in each antenna facilitating rod 168a and 168b, gap 118, and the number of non-metallic links 110 can be configured to cover a particular application such as WiFi, WWAN-LTE, GPS, etc. In this way hinge 106a can be configured to function as an antenna or as an exciting element for the chassis of first housing 102 and second housing 104 to be used as an antenna. Coax cable 120 can be coupled to wireless module 170 and antenna 108a can provide the wireless signaling for wireless module 170.

Figure 3:
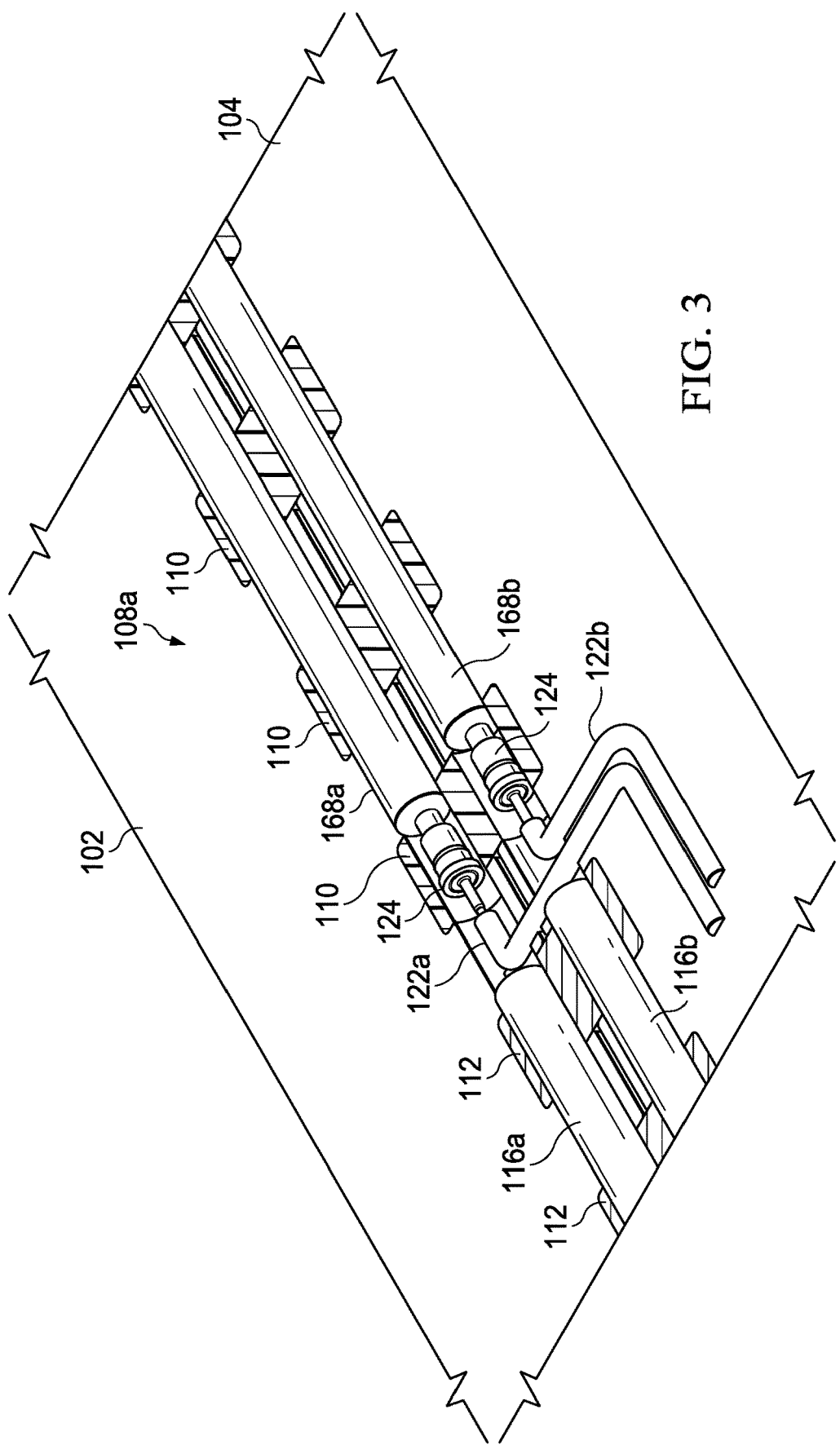
FIG. 3 is a simplified schematic diagram illustrating an orthographic view of a portion of an embodiment of a hinge, in accordance with one embodiment of the present disclosure.

Turning to FIG. 3, FIG. 3 is a simplified block diagram orthographic view of a portion of an embodiment of a hinge, in accordance with one embodiment of the present disclosure. A fastening mechanism 124 can be configured to electrically couple conductor 122a and 122b to each antenna facilitating rod 168a and 168b respectively. For example, fastening mechanism 124 can help secure a portion of conductor 122a to antenna facilitating rod 168a. In addition, fastening mechanism 124 can help secure a portion of conductor 122b to antenna facilitating rod 168b. Fastening mechanism 124 can be a clip, push pin connector, pogo pin connector, or some other connector that can electrically couple conductor 122a and 122b to antenna facilitating rod 168a and 168b respectively. By securing conductor 122a to antenna facilitating rod 168a and conductor 122b to antenna facilitating rod 168b, antenna 108a can be created.

Figure 4:
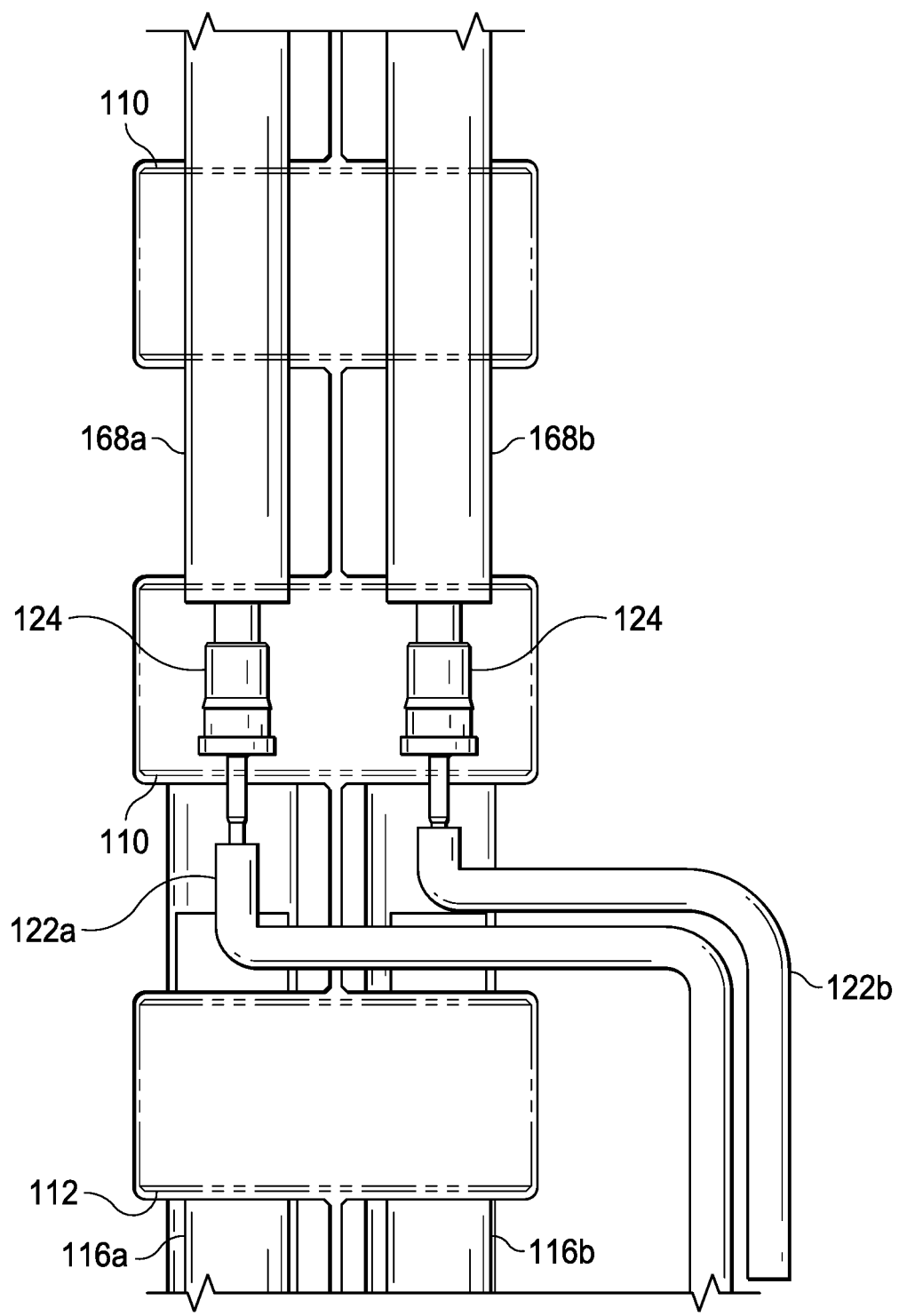
FIG. 4 is a simplified block diagram view of a portion of an embodiment of a hinge, in accordance with one embodiment of the present disclosure.

Turning to FIG. 4, FIG. 4 is a simplified block diagram view of a portion of an embodiment of a hinge, in accordance with one embodiment of the present disclosure. As illustrated in FIG. 4, fastening mechanism 124 can secure conductor 122a to antenna facilitating rod 168a and conductor 122b to antenna facilitating rod 168b. The entry point into antenna facilitating rod 168a and 168b can be located between a non-metallic link 110 and a metallic link 112 or at any intermediary non-metallic link 110.

Figure 5:
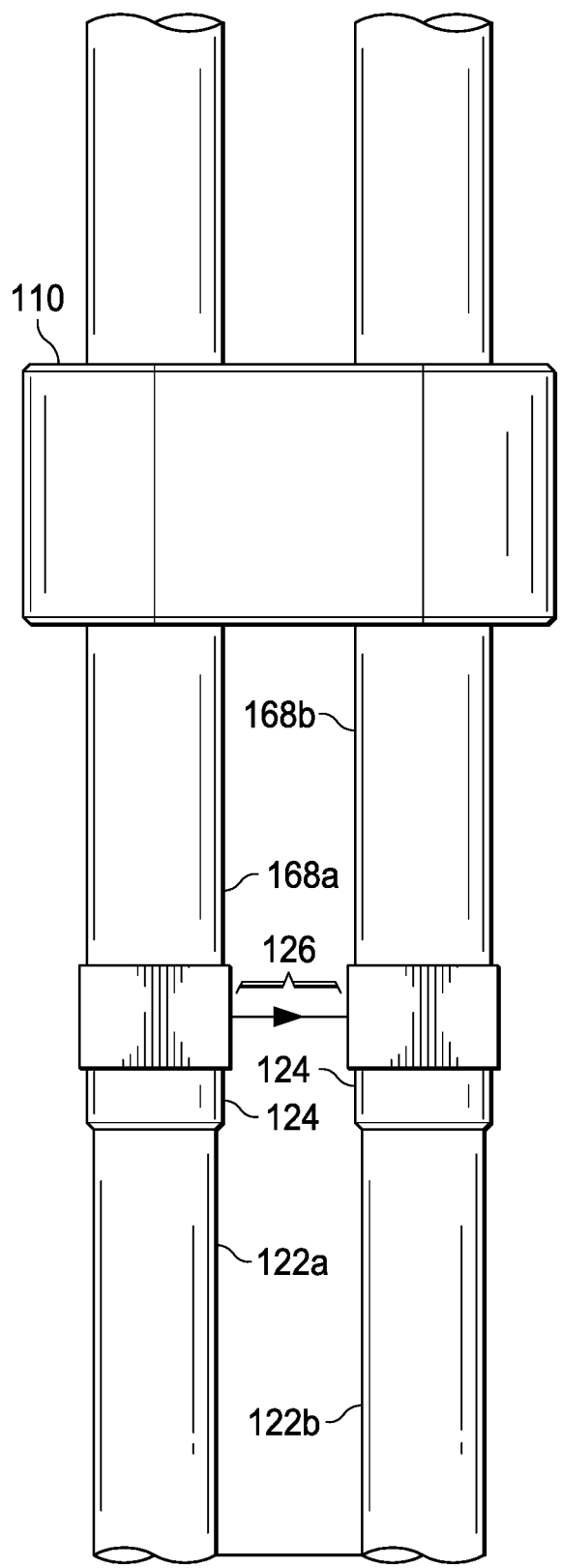
FIG. 5 is a simplified block diagram view of a portion of an embodiment of a hinge, in accordance with one embodiment of the present disclosure.

Turning to FIG. 5, FIG. 5 is a simplified block diagram view of a portion of an embodiment of a hinge, in accordance with one embodiment of the present disclosure. As illustrated in FIG. 5, fastening mechanism 124 can secure conductor 122a to antenna facilitating rod 168a and conductor 122b to antenna facilitating rod 168b. A distance 126 between antenna facilitating rod 168a and 168b can help tune the resonance bandwidth of antenna 108. The length of conductor 122a and 122b in antenna facilitating rod 168a and 168b respectively can also be adjusted to help tune the resonant impedance and gain of antenna 108. For example, since cable is lossy, gain can be controlled by using an appropriate length of conductors 122a and 122b to keep gain at a desired level (e.g., under a level allowed by regulatory bodies).

Figure 6:
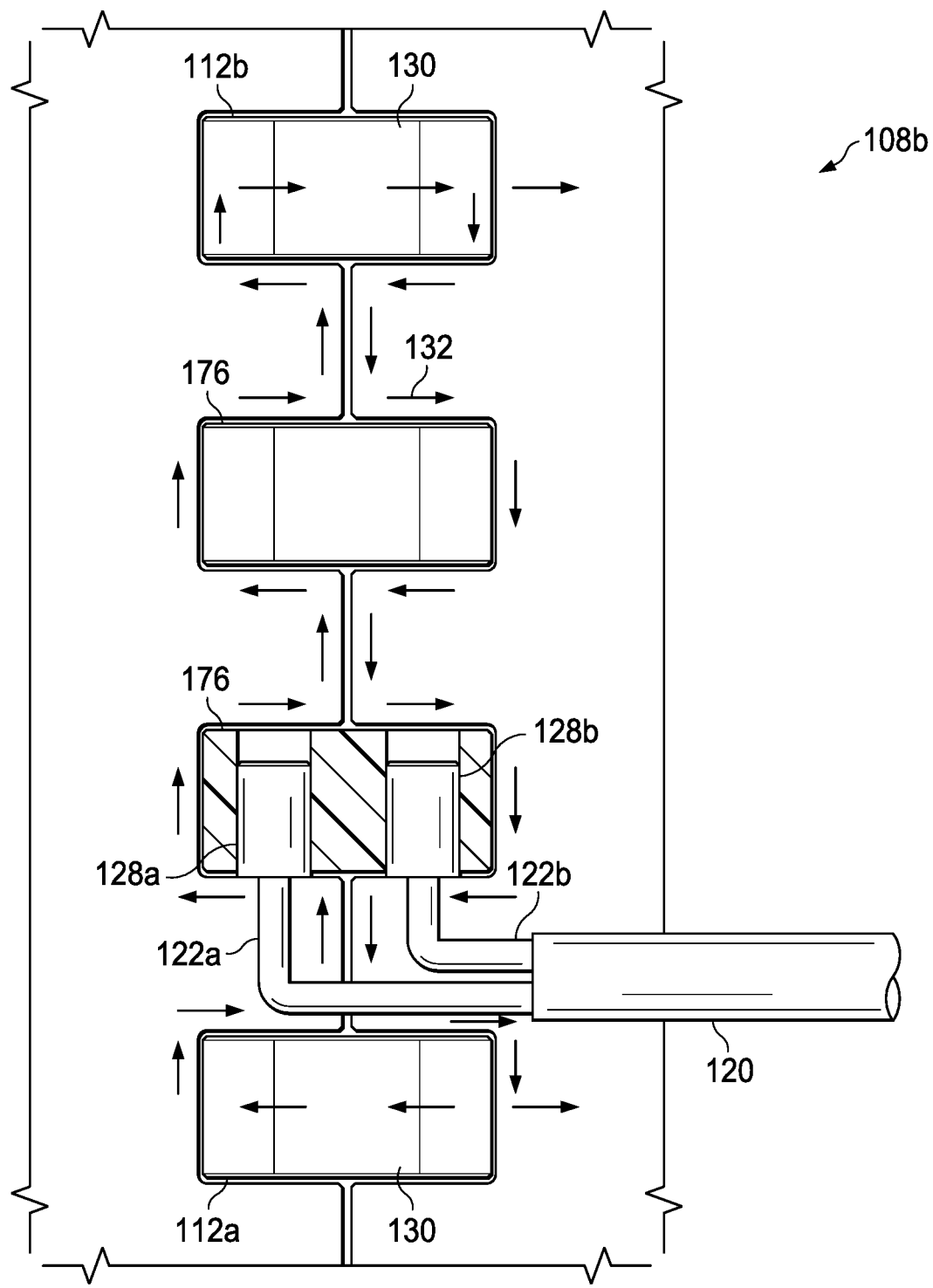
FIG. 6 is a simplified block diagram view of a portion of an embodiment of a hinge, in accordance with one embodiment of the present disclosure.

Turning to FIG. 6, FIG. 6 is a simplified block diagram view of a portion of an embodiment of a meander slot antenna 108b, in accordance with one embodiment of the present disclosure. Meander slot antenna 108b can be configured as a meander slot antenna formation. Meander slot antenna 108b can include metallic links 112a and 112b and one or more (non metallic) resonance links 176a and 176b. In meander slot antenna 108b, a metallic link 112a before a first resonance link 176a and a metallic link 112b after the last resonance link 176b can each include a conductive link 130. First resonance link 176a can include a metallic feed rod 128a and 128b. Conductors 122a and 122b can be secured to first resonance link 176a using metallic feed rod 128a and 128b respectively. One or more resonance links (e.g., resonance links 176a and 176b) can collectively form a meander slot resonance 132 where a slot for the meander slot antenna is formed by the outline between resonance links 176. Gaps in between each resonance link (e.g., resonance links 176a and 176b) and a gap in an outer section (e.g., a distance between each link and an edge of first housing 102 and second housing 104) can be configured for a desired antenna resonance frequency requirement for meander slot antenna 108b. The total length along the meander slot relates directly to the resonant frequency of the antenna For example, the total length of the meandered slot can be about 0.5 times the wavelength at resonance.

Figure 7:
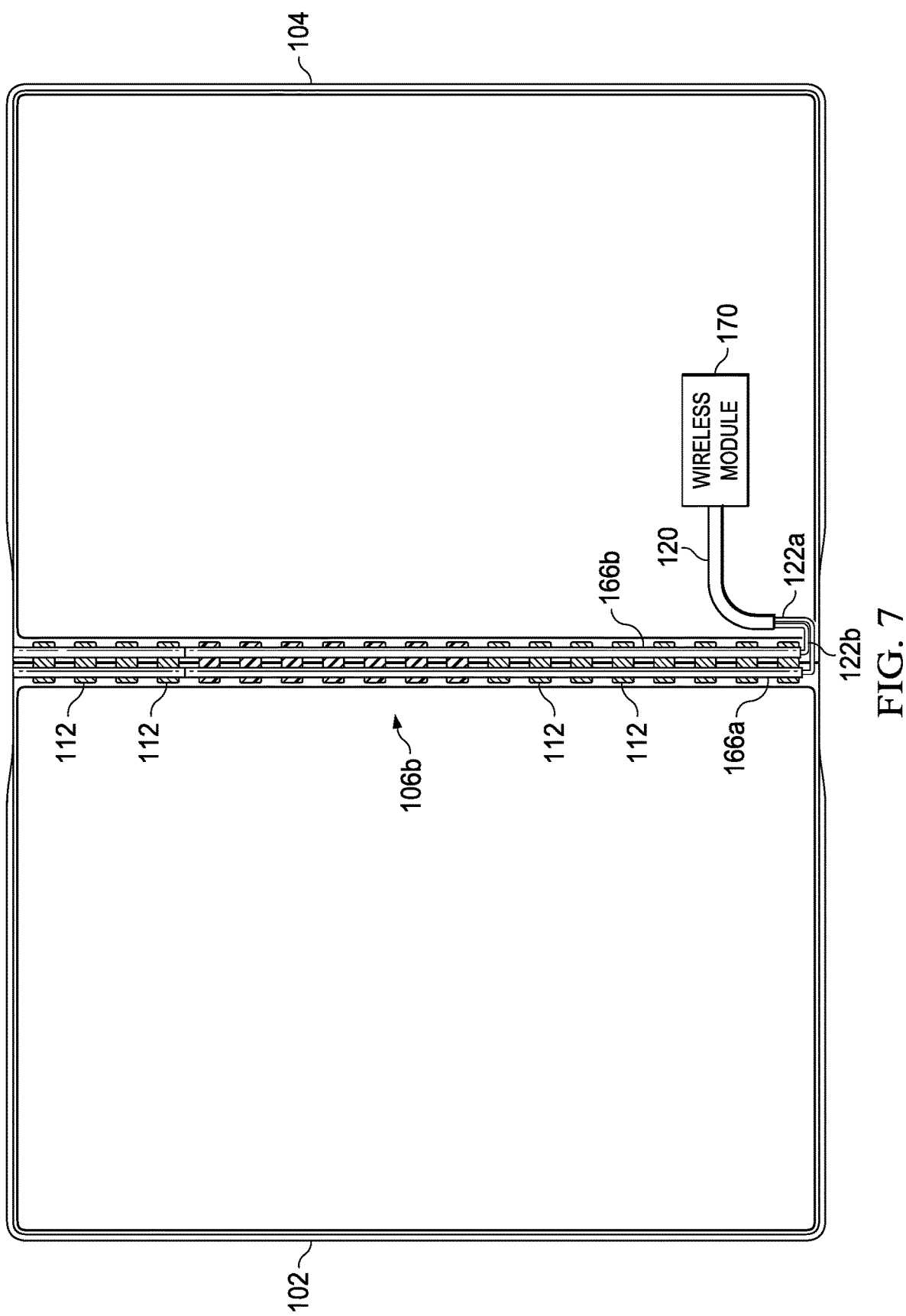
FIG. 7 is a simplified block diagram view of an embodiment of an electronic device, in accordance with one embodiment of the present disclosure.

Turning to FIG. 7, FIG. 7 is a simplified block diagram view of an embodiment of a hinge 106b, in accordance with one embodiment of the present disclosure. As illustrated in FIG. 7, hinge 106b can include metallic links 112 and resonance rods 166a and 166b. Resonance rods 166a and 166b can run the entire length or a majority of the length of hinge 106b. Conductors 122a and 122b can be coupled to an end of hinge 106b. In an example, the sizing the hinge rods and length of conductors 122a and 122b inside each resonance rod 166a and 166b respectively can create a current distribution that is naturally tuned to radiate at a desired frequency for an antenna for wireless module 170. At the frequency of about several 100 MHz to few GHz, the chassis dimension of first housing 102 and second housing 104 as a ratio to wavelength is large enough that the chassis can be considered through full wave electromagnetics, not a circuit based approach. Also, electrical isolation between adjacent antennas realized in different sections of the hinge is not needed as the created antennas are exploiting the characteristics modes already present in the chassis and are not behaving as shorted circuit elements. This allows multiple antennas either to support different frequencies and radio modules or to serve as individual antennas in a Multiple Input Multiple Output antenna configuration or as elements of an antenna array)

Figure 8:
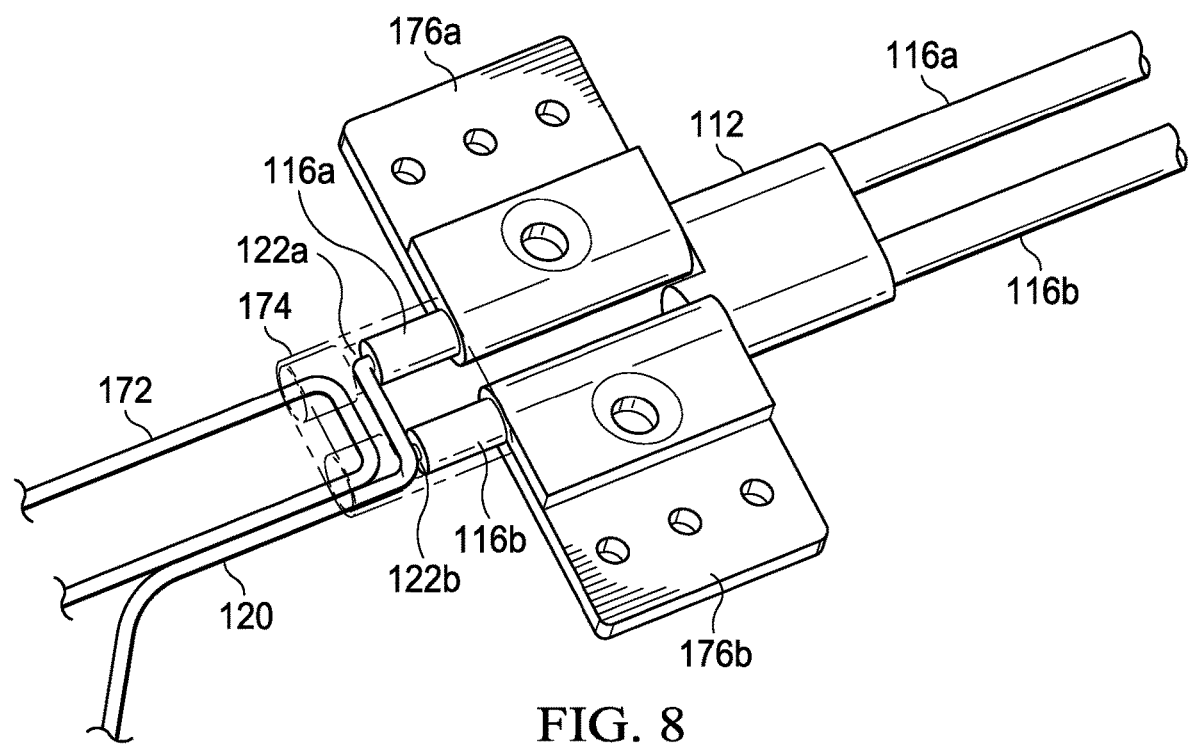
FIG. 8 is a simplified schematic diagram illustrating an orthographic view of a portion of an embodiment of a hinge, in accordance with one embodiment of the present disclosure.

Turning to FIG. 8, FIG. 8 is a simplified block diagram orthographic view of a portion of an embodiment of a hinge, in accordance with one embodiment of the present disclosure. As illustrated in FIG. 8, conductor 122a has been inserted into hinge rod 116a and conductor 122b has been inserted into hinge rod 116b. In an example, coax cable 120 can be direct soldered to an end of hinge rods 116a and 116b. A center conductor 172 can cross between hinge rods 116a and 116b (the two axles) directly without any added length. For tuning the antenna, a PCB (e.g., PCB 178 shown in FIG. 9) with components can be configured to tune the antenna. Cap 174 can cover the ends of hinge rods 116a and 116b, coax cable 120, and center conductor 172. If a PCB is not present, then a micro coax outer conductor can terminated on one end of hinge rod 116a and a center conductor can be terminated on hinge rod 116b. In another implementation, center conductor 172 can include a separate coax cable to feed a second antenna. Coax cable 120 can include one center conductor 122a and an outer conductor 122b that can be soldered or otherwise connected to hinge rods 116a and 116b.

Figure 9:
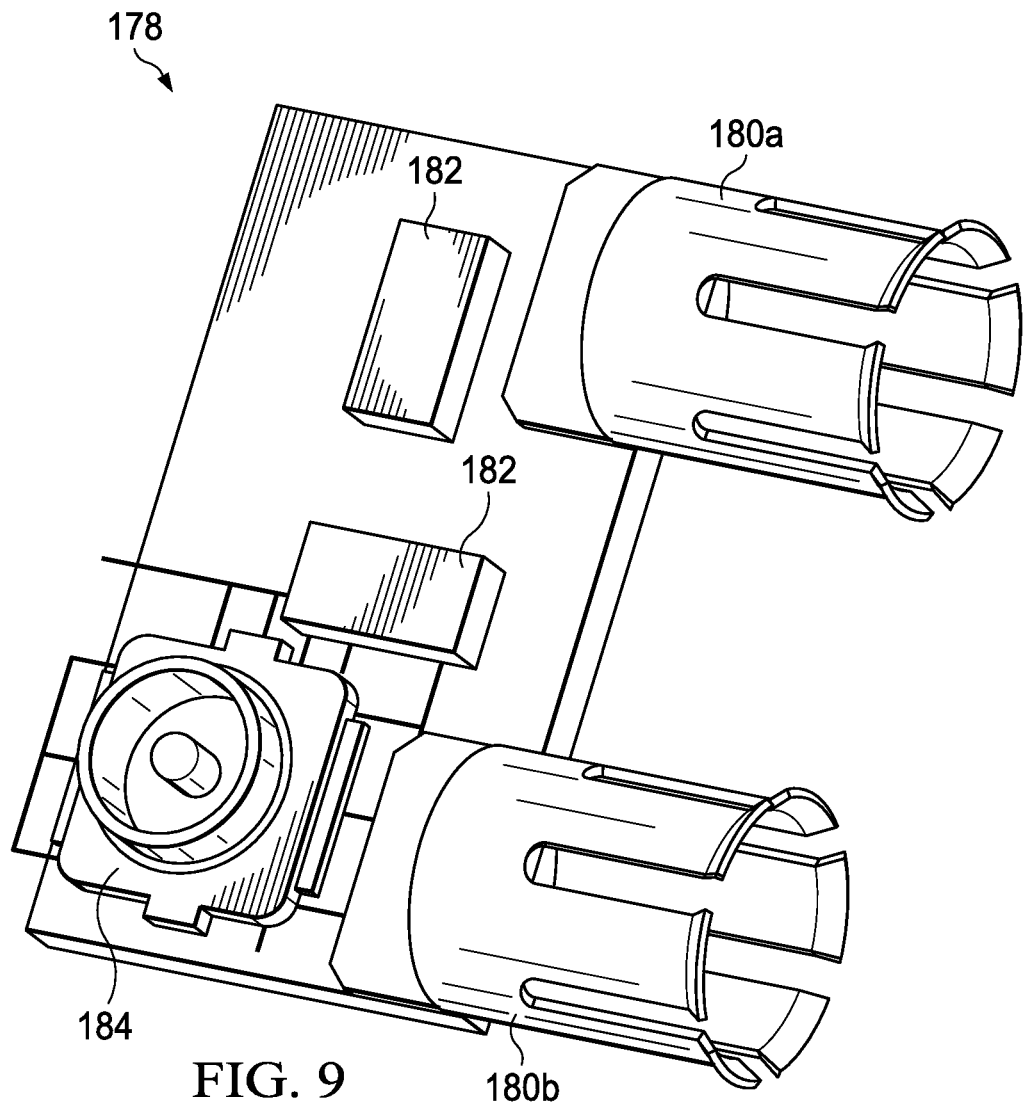
FIG. 9 is a simplified schematic diagram illustrating an orthographic view of a portion of an embodiment of a hinge, in accordance with one embodiment of the present disclosure.

Turning to FIG. 9, FIG. 9 is a simplified block diagram orthographic view of a PCB 178, in accordance with one embodiment of the present disclosure. PCB 178 can include connectors 180a and 180b, one or more tuning modules 182, and a coax connector 184. Connectors 180a and 180b can each be configured to connect to a hinge rod. For example, connector 180a can snap connect to hinge rod 116a and connector 180b can snap connect to hinge rod 116b. Each tuning module 182 may be a resistor/capacitor tuning surface mount technology (SMT) component. Coax connector 184 may be a coax micro connector or a solder pad for direct coax attachment.

Figure 10:
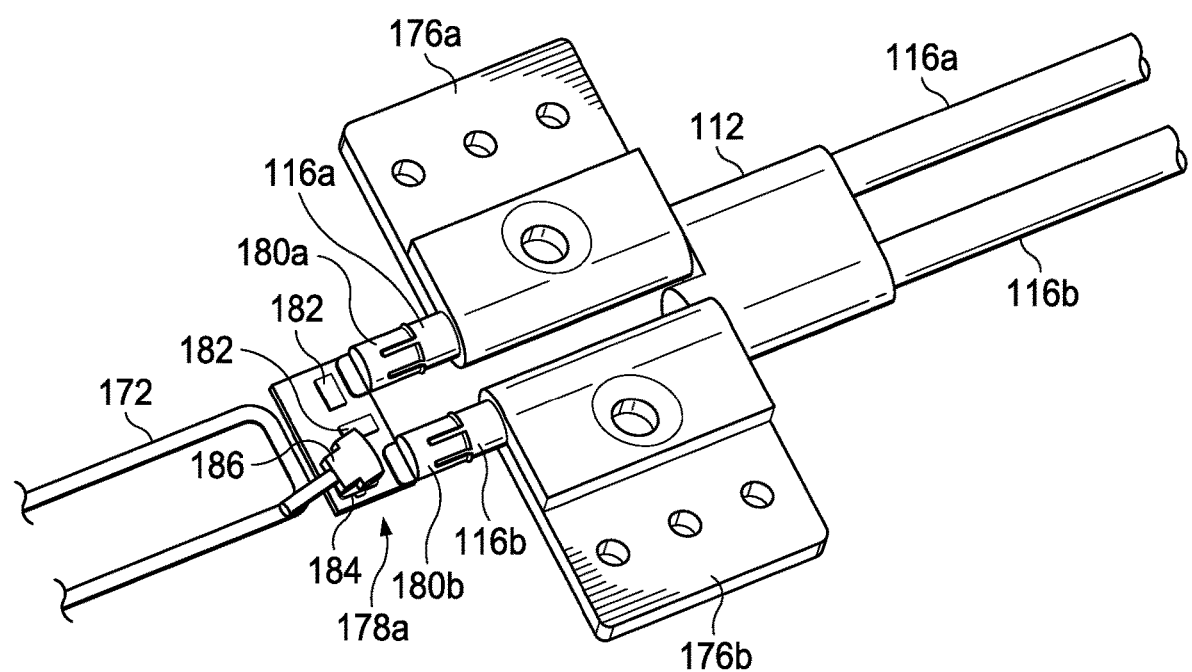
FIG. 10 is a simplified schematic diagram illustrating an orthographic view of a portion of an embodiment of a hinge, in accordance with one embodiment of the present disclosure.

Turning to FIG. 10, FIG. 10 is a simplified block diagram orthographic view of an embodiment of a hinge, in accordance with one embodiment of the present disclosure. PCB 178a can be connected to hinge rods 116a and 116b using connectors 180a and 180b respectively. Cable coax connector 186 can be coupled to coax connector 184 to couple a coax cable to a hinge and enable the hinge to be configured as an antenna. One or more tuning modules 182 can tune the antenna to a desired antenna resonance frequency and terminal impedance requirement.

Figure 11:
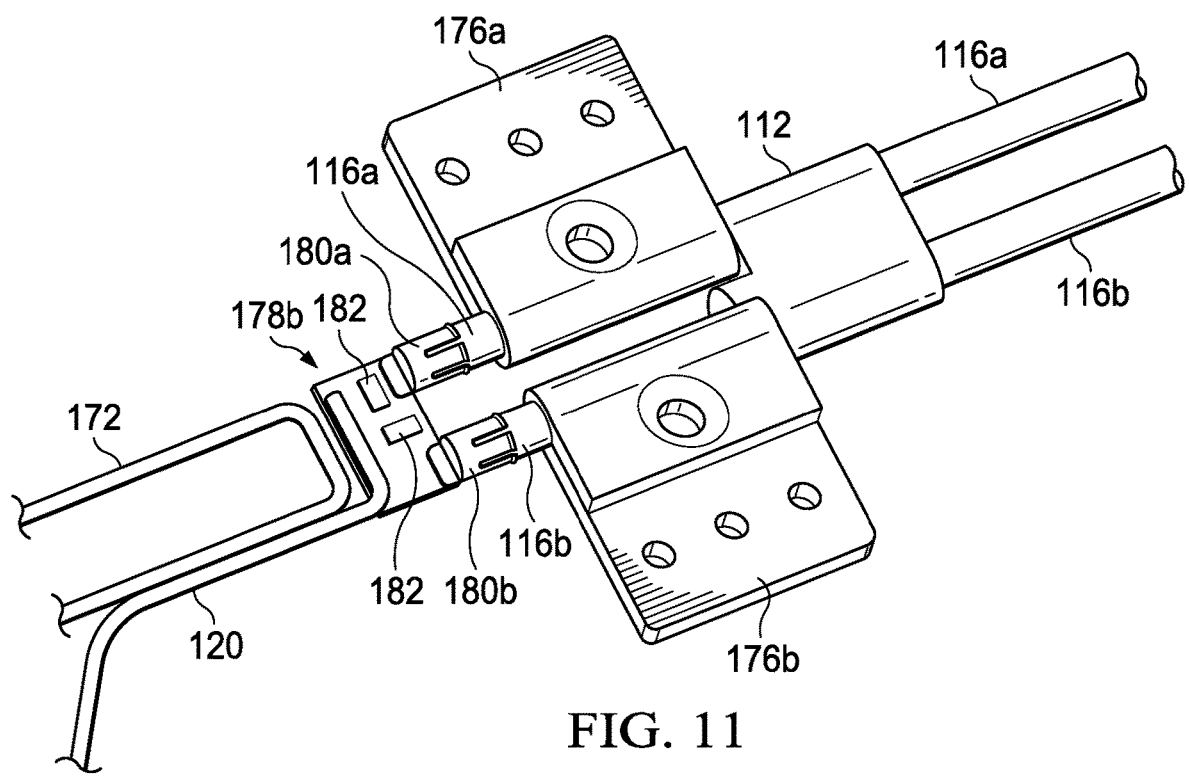
FIG. 11 is a simplified schematic diagram illustrating an orthographic view of a portion of an embodiment of a hinge, in accordance with one embodiment of the present disclosure.

Turning to FIG. 11, FIG. 11 is a simplified block diagram orthographic view of an embodiment of a hinge, in accordance with one embodiment of the present disclosure. PCB 178b can be connected to hinge rods 116a and 116b using connectors 180a and 180b respectively. Coax cable 120 can be directly soldered or otherwise coupled to PCB 178b to enable the hinge to be configured as an antenna. One or more tuning modules 182 can tune the antenna to a desired antenna resonance frequency and terminal impedance requirement.

Figure 12:
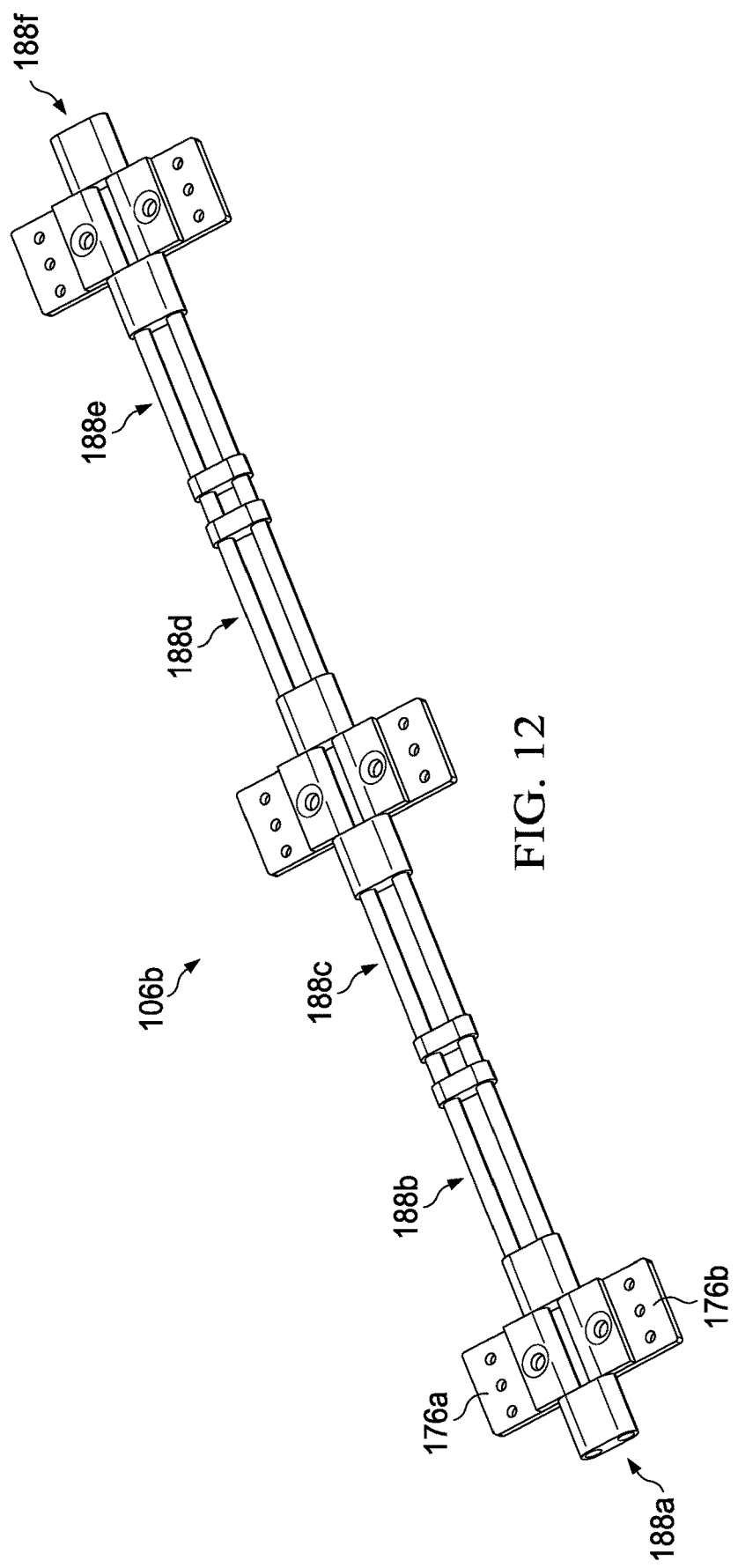
FIG. 12 is a simplified schematic diagram illustrating an orthographic view of an embodiment of a hinge, in accordance with one embodiment of the present disclosure.

Turning to FIG. 12, FIG. 12 is a simplified block diagram orthographic view of an embodiment of a hinge 106b, in accordance with one embodiment of the present disclosure. As illustrated in FIG. 12, hinge 106b can include several different areas where coax cable 120 or conductors 122a and 122b may be inserted into hinge 106b to create an antenna. For example, coax cable 120 or conductor 122a and 122b may be inserted at any one of entry points 188a-188f. In an example, two or more coax cables 120 or conductors 122a and 122*b* may each be inserted into a respective entry point 188*a*-188*f*. This can allow hinge 106*b* (and other hinges discussed herein) to be configured as an antenna for one or more wireless devices or one or more wireless modules.

Figure 13A:
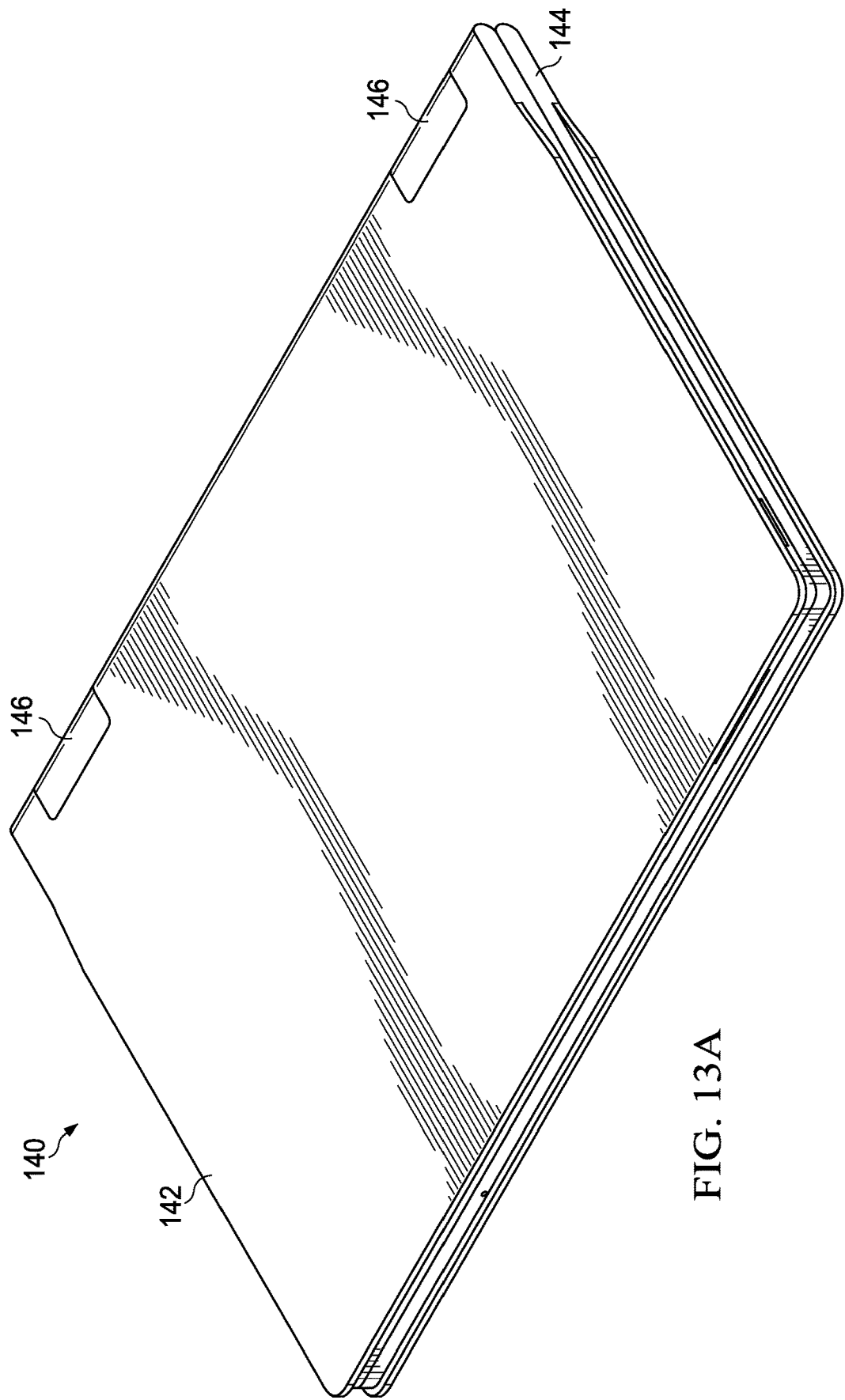
FIG. 13A is a simplified schematic diagram illustrating an orthographic view of an embodiment of an electronic device, in accordance with one embodiment of the present disclosure.
Figure 13B:
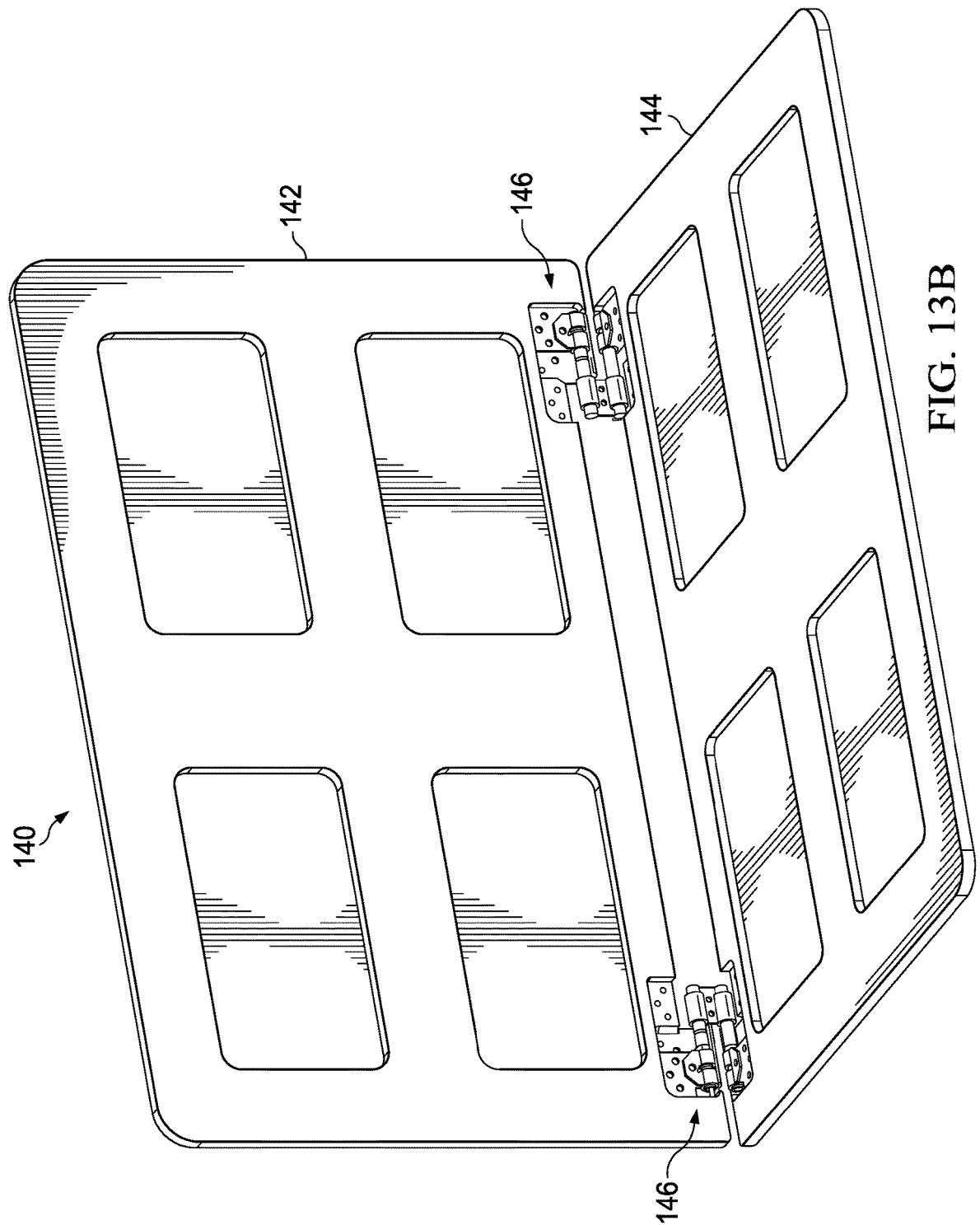
FIG. 13B is a simplified schematic diagram illustrating an orthographic view of an embodiment of an electronic device, in accordance with one embodiment of the present disclosure.

Turning to FIG. 13A, FIG. 13A is a simplified block diagram orthographic view of a portion of an embodiment of a low profile electronic device 140 in a closed clamshell configuration, in accordance with one embodiment of the present disclosure. Low profile electronic device 140 may be a low profile, relatively thin electronic device and can include a low profile first housing 142, a low profile second housing 144, and antenna hinge 146. In an example, antenna hinge 146 can be a three hundred and sixty degree (360°) hinge and can include an antenna. Antenna hinge 146 can be configured as a radiative hinge to allow antenna hinge 146 to function as an antenna for a wireless device or module. Turning to FIG. 13B, FIG. 13B is a simplified block diagram view of a portion of an embodiment of low profile electronic device 140 in an open configuration, in accordance with one embodiment of the present disclosure.

Figure 14:
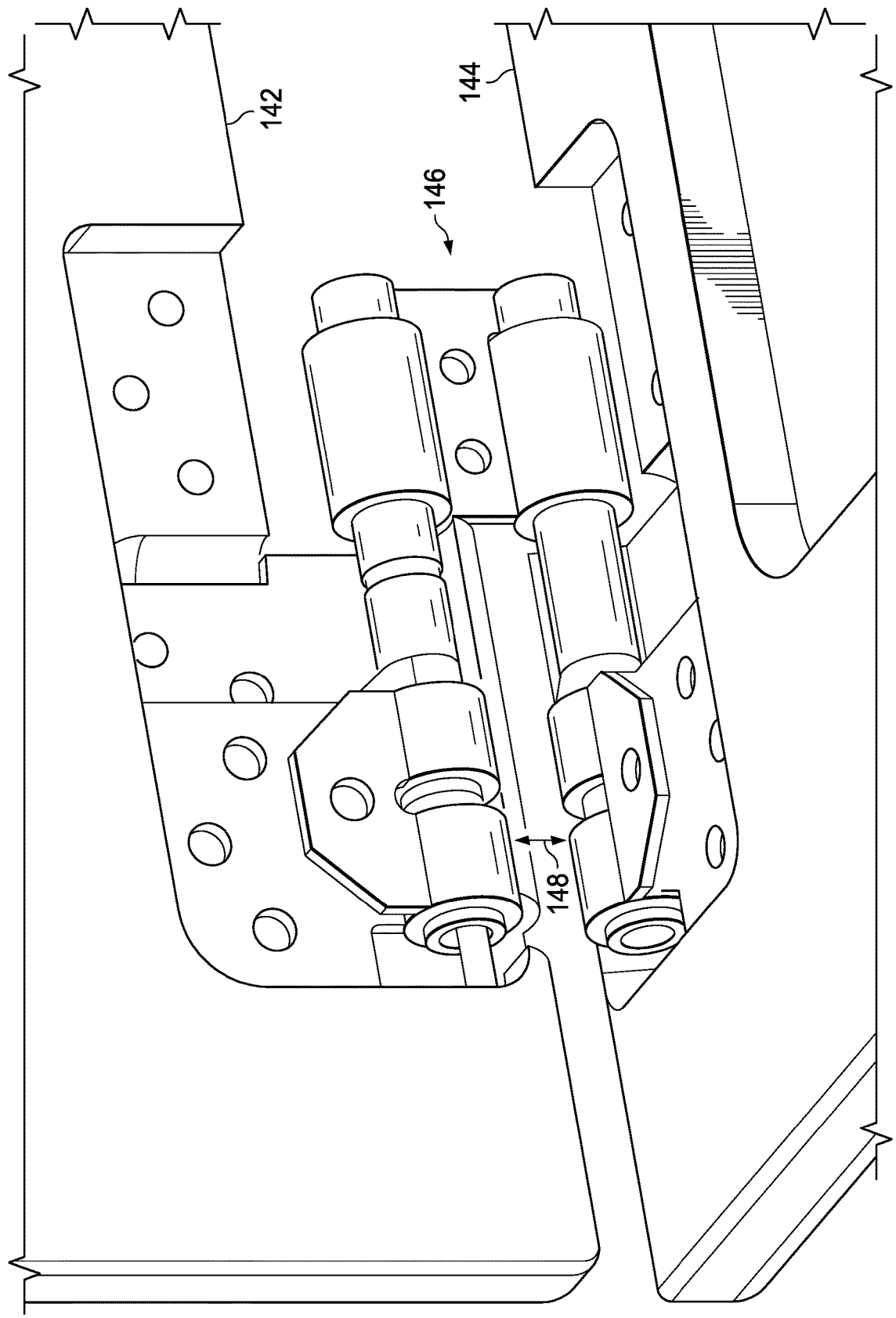
FIG. 14 is a simplified schematic diagram illustrating an orthographic view of a portion of an embodiment of an electronic device, in accordance with one embodiment of the present disclosure.

Turning to FIG. 14, FIG. 14 is a simplified block diagram orthographic view of a portion of an embodiment of an antenna hinge 146, in accordance with one embodiment of the present disclosure. Antenna hinge 146 can function as a slot antenna where a rod area 148 between the two hinge rods along with the space between low profile first housing 142 and low profile second housing 144 can be configured as a slot antenna. Antenna hinge 146 can separate low profile first housing 142 and low profile second housing 144, creating rod area 148. Unlike conventional hinges with a single axis of rotation, the dual axis of rotation in antenna hinge 146 can substantially maintain the width of slot area vs lid angle, leading to relatively stable antenna.

Figure 15:
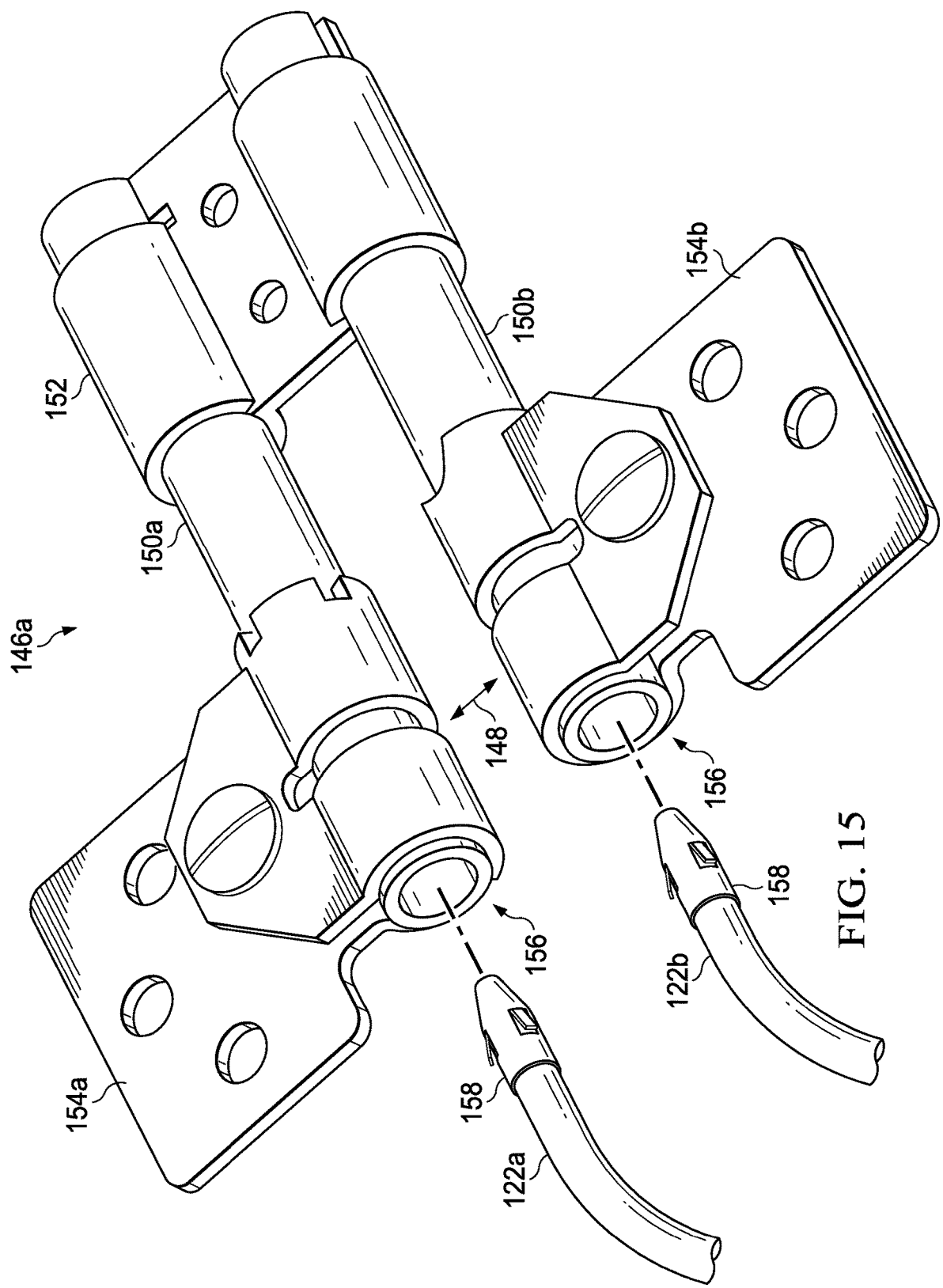
FIG. 15 is a simplified schematic diagram illustrating an orthographic view of an embodiment of a hinge, in accordance with one embodiment of the present disclosure.

Turning to FIG. 15, FIG. 15 is a simplified block diagram orthographic view of a portion of an embodiment of an antenna hinge 146*a*, in accordance with one embodiment of the present disclosure. Antenna hinge 146*a* can include a first hinge rod 150*a*, a second hinge rod 150*b*, dual axis rotating member 152, first housing securing means 154*a*, and second housing securing means 154*b*. Dual axis rotating member 152 can allow for a dual axis of rotation. In one example, a tapered cable gland 158 on conductor 122*a* can be inserted into a cavity 156 of first housing securing means 154*a* and couple conductor 122*a* to antenna hinge 146*a* and tapered cable gland 158 on conductor 122*b* can be inserted into a cavity 156 of second housing securing means 154*b* and couple conductor 122*b* to antenna hinge 146*a*. When conductors 122*a* and 122*b* are coupled to antenna hinge 146*a* using tapered cable gland 158, antenna hinge 146*a* can be rotated 360°. The dual axis of rotation in antenna hinge 146*a* can substantially maintain the width of slot area vs lid angle, leading to a relatively stable antenna created by conductor 122*a* and 122*b* coupled to antenna hinge 146*a*. While FIG. 11 illustrates a press fit type of connection, in one example, the ends of antenna hinge 146*a* can rotate if the axles of antenna hinge 146*a* are not fixed with a static bracket and are allowed to rotate. In other example, antenna hinge 146*a* may be a gear hinge where the axles of the hinge can rotate relative to each other.

Figure 16:
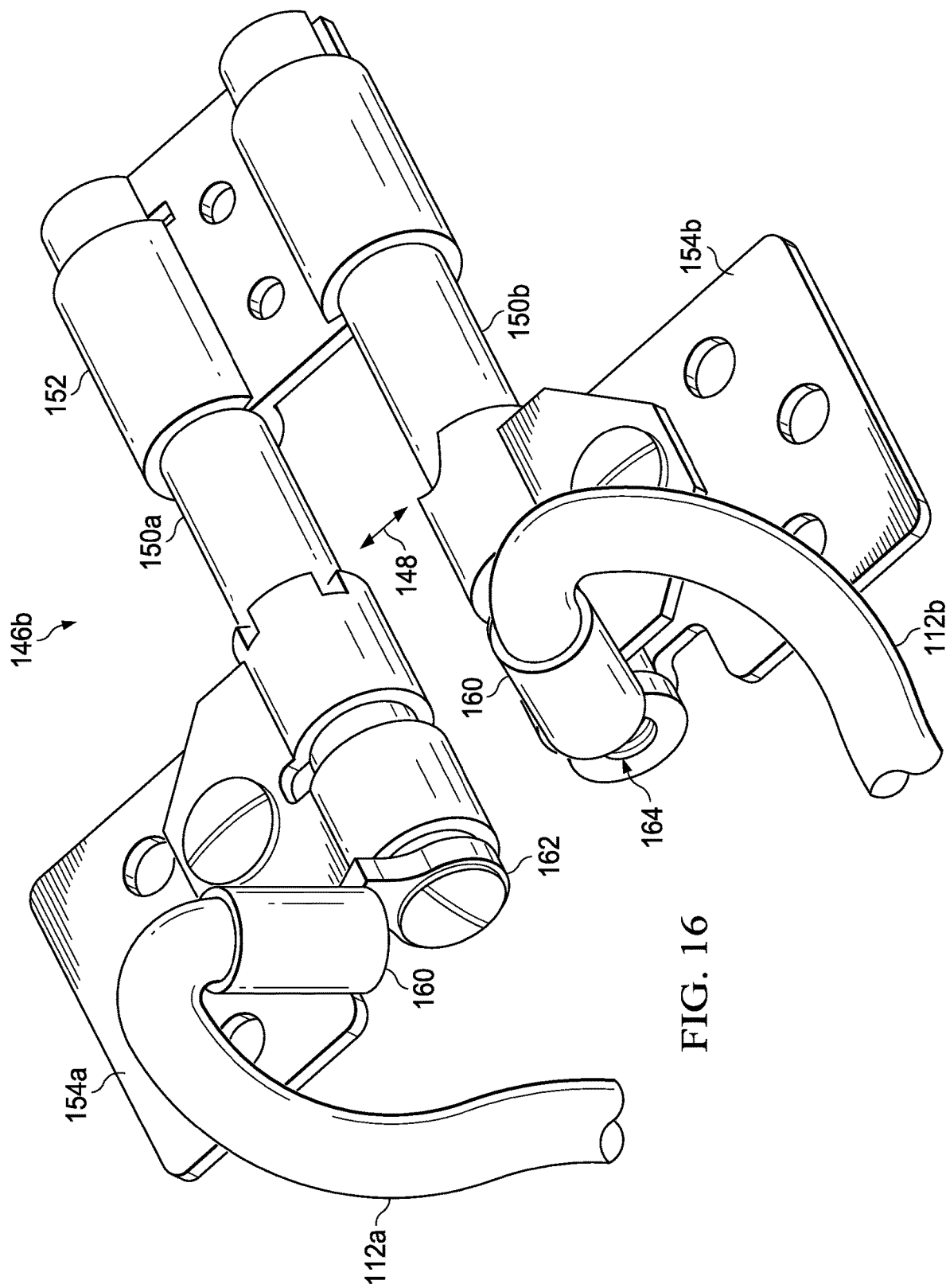
FIG. 16 is a simplified schematic diagram illustrating an orthographic view of an embodiment of a hinge, in accordance with one embodiment of the present disclosure.

Turning to FIG. 16, FIG. 16 is a simplified block diagram orthographic view of a portion of an embodiment of an antenna hinge 146*b*, in accordance with one embodiment of the present disclosure. Antenna hinge 146*b* can include first hinge rod 150*a*, second hinge rod 150*b*, dual axis rotating member 152, first housing securing means 154*a*, and second housing securing means 154*b*. In one example, a blade connector 160 can couple conductors 122*a* and 122*b* to antenna hinge 146*b* using fastener 162. Fastener 162 can be coupled to a threaded opening 164 in antenna hinge 146*b*. When conductors 122*a* and 122*b* are coupled to antenna hinge 146*b* using blade connector 160 and fastener 162, antenna hinge 146*b* can be rotated 360°. The dual axis of rotation in antenna hinge 146*b* can substantially maintain the width of rod area vs lid angle, leading to a relatively stable antenna created by conductors 122*a* and 122*b* coupled to antenna hinge 146*b*.

Figure 17:
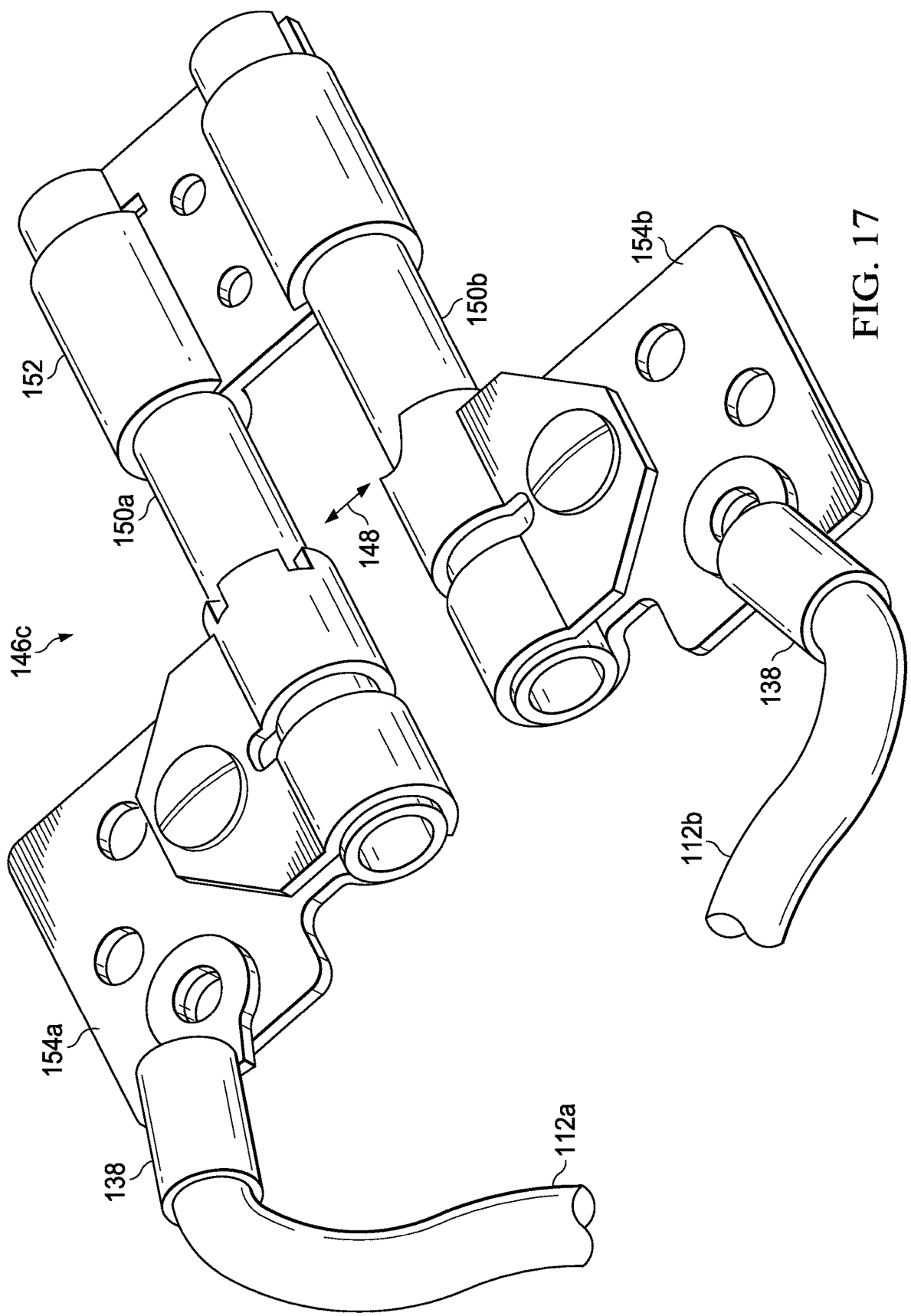
FIG. 17 is a simplified schematic diagram illustrating an orthographic view of an embodiment of a hinge, in accordance with one embodiment of the present disclosure.

Turning to FIG. 17, FIG. 17 is a simplified block diagram orthographic view of a portion of an embodiment of an antenna hinge 146*c*, in accordance with one embodiment of the present disclosure. Antenna hinge 146*c* can include first hinge rod 150*a*, second hinge rod 150*b*, dual axis rotating member 152, first housing securing means 154*a*, and second housing securing means 154*b*. In one example, an apex fastener 138 can couple conductors 122*a* and 122*b* to antenna hinge 146*c*. When conductors 122*a* and 122*b* are coupled to antenna hinge 146*c* using apex fastener 138, antenna hinge 146*c* can be rotated 360°. The dual axis of rotation in antenna hinge 146*c* can substantially maintain the width of rod area vs lid angle, leading to a relatively stable antenna created by conductors 122*a* and 122*b* coupled to antenna hinge 146*c*. While tapered cable gland 158 in FIG. 11, blade connector 160 in FIG. 13, and apex fastener 138 in FIG. 14 are used to couple conductors 122*a* and 122*b* to antenna hinges 146*a*, 146*b*, and 146*c* respectively and create an antenna, other types of fasteners may be used such as a J-hook, bushing, barrier strip, spade lug, crimp, screw terminal, etc.

It should be noted that some embodiments include where the slot formed by the lid and base are the primary radiator and other embodiments where the hinge rod itself is the primary radiator. In the latter case, the systems can be relatively thicker as two closely spaced rods may not provide meaningful bandwidth. In one example, the rods may be separated by at least five to six mm. In cases where the spacing is not possible, the rod can act as a feeding element to the slot which is typically wider. However, in some instances, this can make it harder to control from a frequency, Impedance, and platform noise pickup perspective.

Figure 18A:
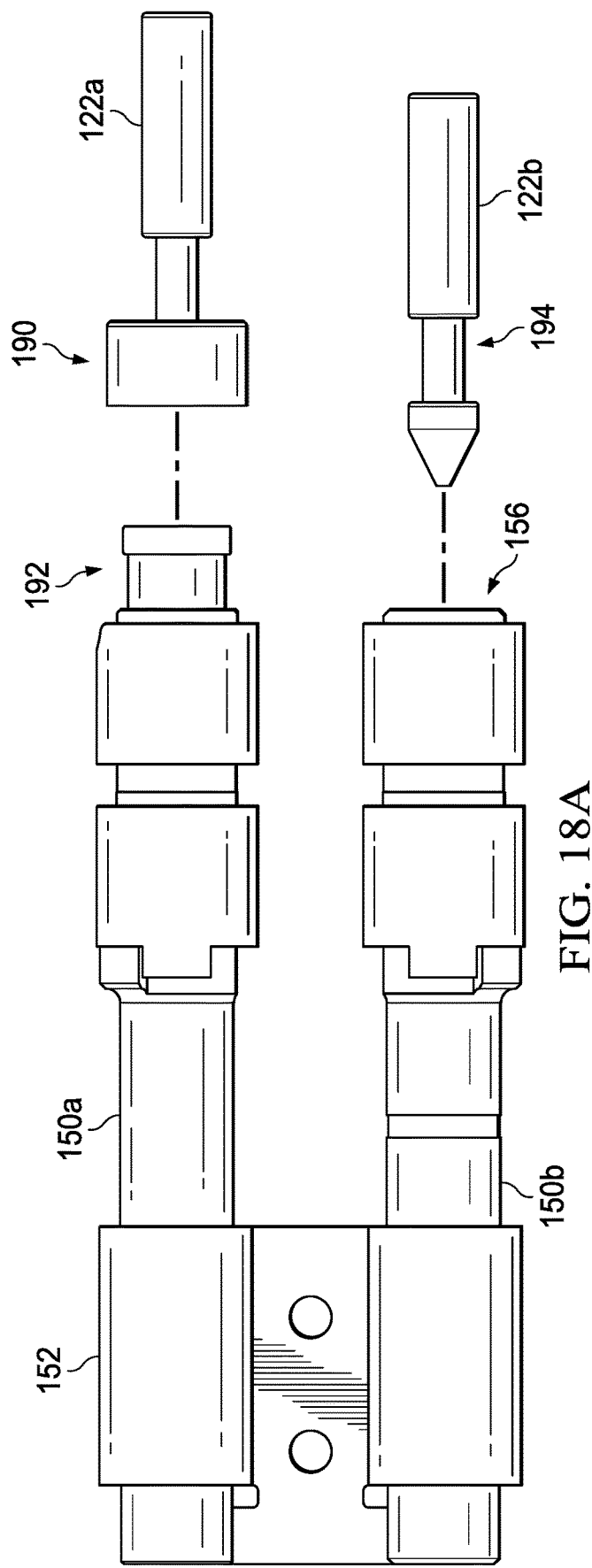
FIG. 18A is a simplified block diagram view of a portion of an embodiment of a portion of a hinge, in accordance with one embodiment of the present disclosure.
Figure 18B:
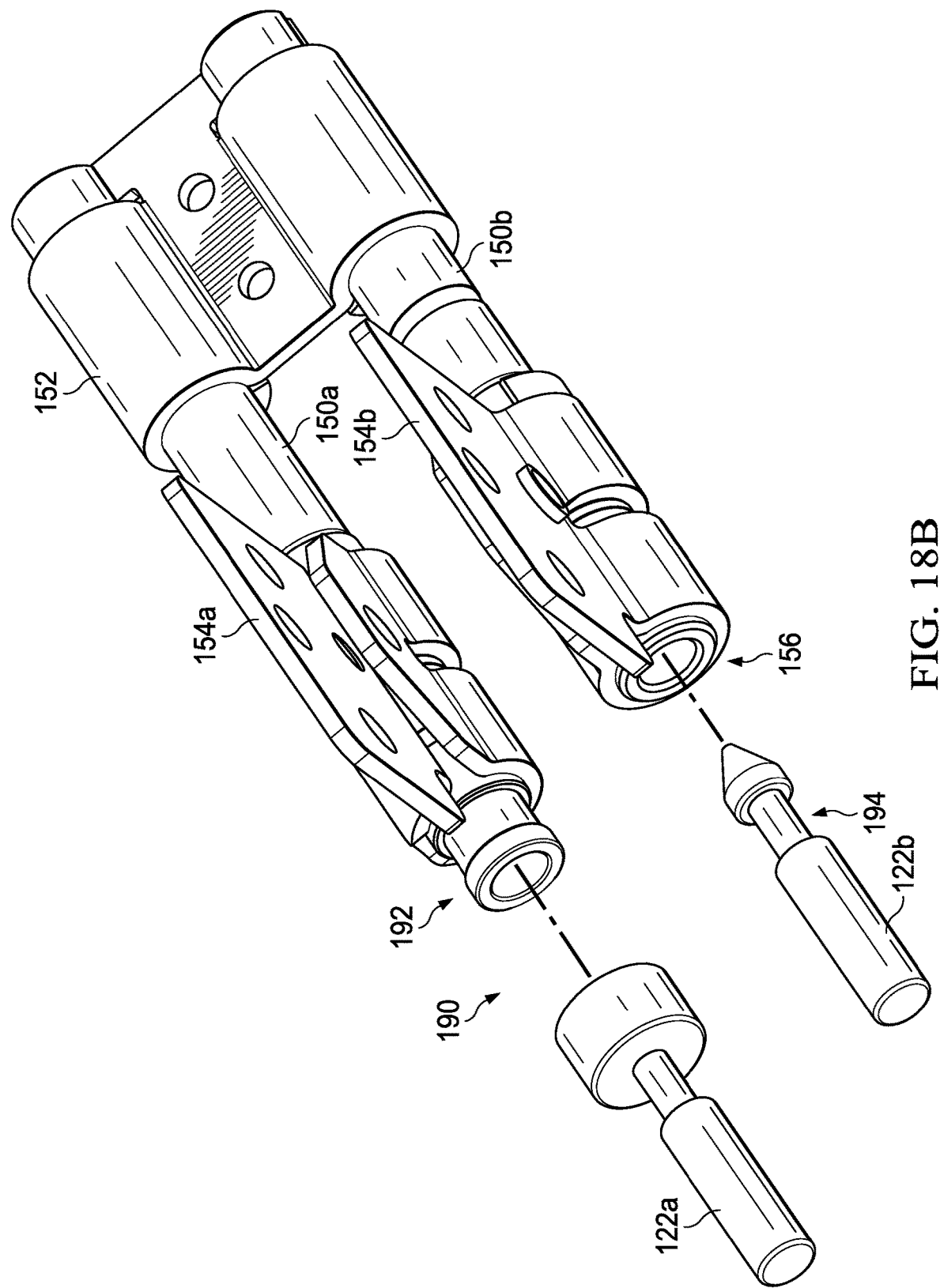
FIG. 18B is a simplified schematic diagram illustrating an orthographic view of an embodiment of a portion of a hinge, in accordance with one embodiment of the present disclosure.

Turning to FIGS. 18A and 18B, FIG. 18A is a simplified block diagram view of a portion of an embodiment of an antenna hinge, in accordance with one embodiment of the present disclosure and FIG. 18B is a simplified block diagram orthographic view of a portion of an embodiment of an antenna hinge, in accordance with one embodiment of the present disclosure. As illustrated in FIGS. 18A and 18B, different types of connectors may be used to couple conductors 122*a* and 122*b* to antenna hinge 146 and create an antenna. For example, a spring probe 190 may have a cupped end and couple to a cup end connector 192. Spring probe 190 could snap on the outside of cup end connector 192 to form the antenna. In another example, tipped spring probe 194 may have a pointed end and register in the inside of cavity 156 where a tip of tipped spring probe 194 centers on a small countersink. Any combination of spring probe 190 and tipped spring probe 194 may be used to couple wires to a hinge to create an antenna. For example, spring probe 190 may be used to couple both conductors 122*a* and 122*b* to antenna hinge 146 and create an antenna or tipped spring probe 194 may be used to couple both conductors 122*a* and 122*b* to antenna hinge 146 and create an antenna. In addition, different types of connectors may be used (e.g., cupped, pointed, rounded, etc.) to couple wires to a hinge and create an antenna.

Figure 19:
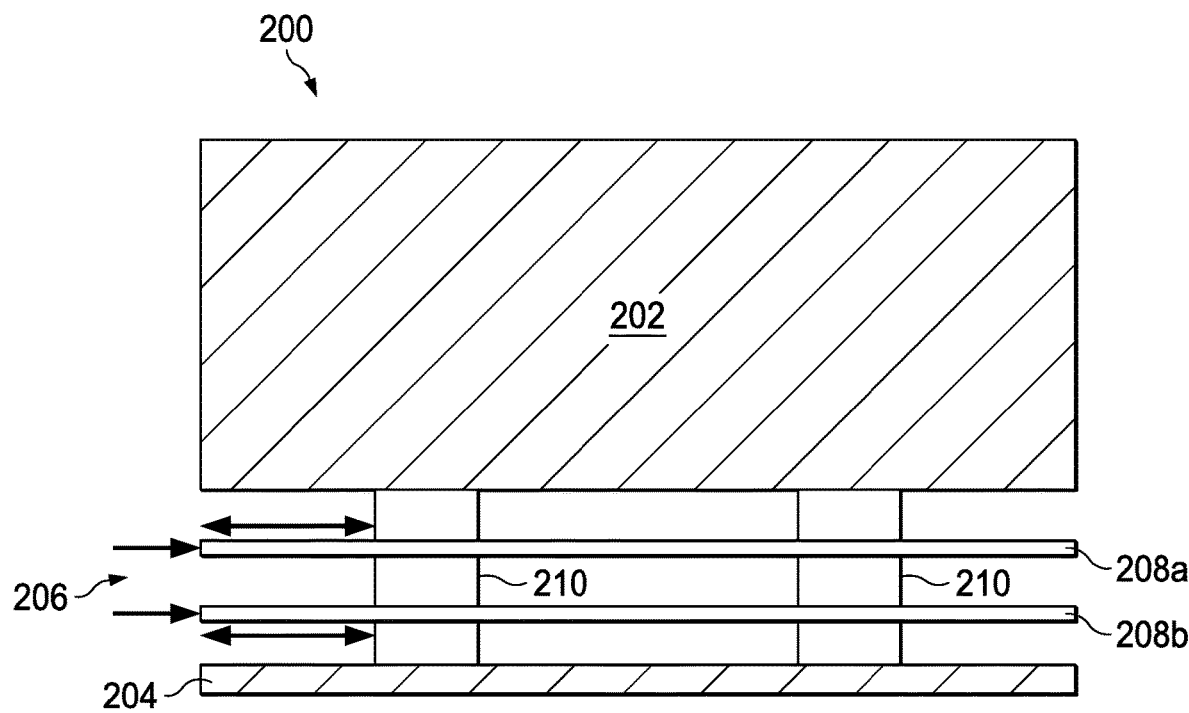
FIG. 19 is a simplified schematic diagram illustrating a block diagram view of an electronic device that includes an embodiment of a hinge, in accordance with one embodiment of the present disclosure.

Turning to FIG. 19, FIG. 19 is a simplified block diagram view of an electronic device 200 with an antenna hinge, in accordance with one embodiment of the present disclosure. Electronic device 200 can include a first housing 202, a second housing 204, and a resonance hinge 206 that rotatably couples first housing 202 to second housing 204. Resonance hinge 206 can be configured as a radiative hinge to allow resonance hinge 206 to function as an antenna for a wireless device or module. Resonance hinge 206 can include resonance rods 208a and 208b and one or more hinge blocks 210. One or more hinge blocks 210 can rotatably couple first housing 202 to second housing 204. In an example, wires can be fed into resonance rods 208a and 208b to allow resonance hinge 206 to be configured as an antenna. Resonance rods 208a and 208b may be separated to allow for adequate bandwidth (e.g., less than 10 mm) and hinge blocks 210 allow resonance rods 208a and 208b to retain the separation as first housing 202 rotates with respect to second housing 204.

Figure 20:
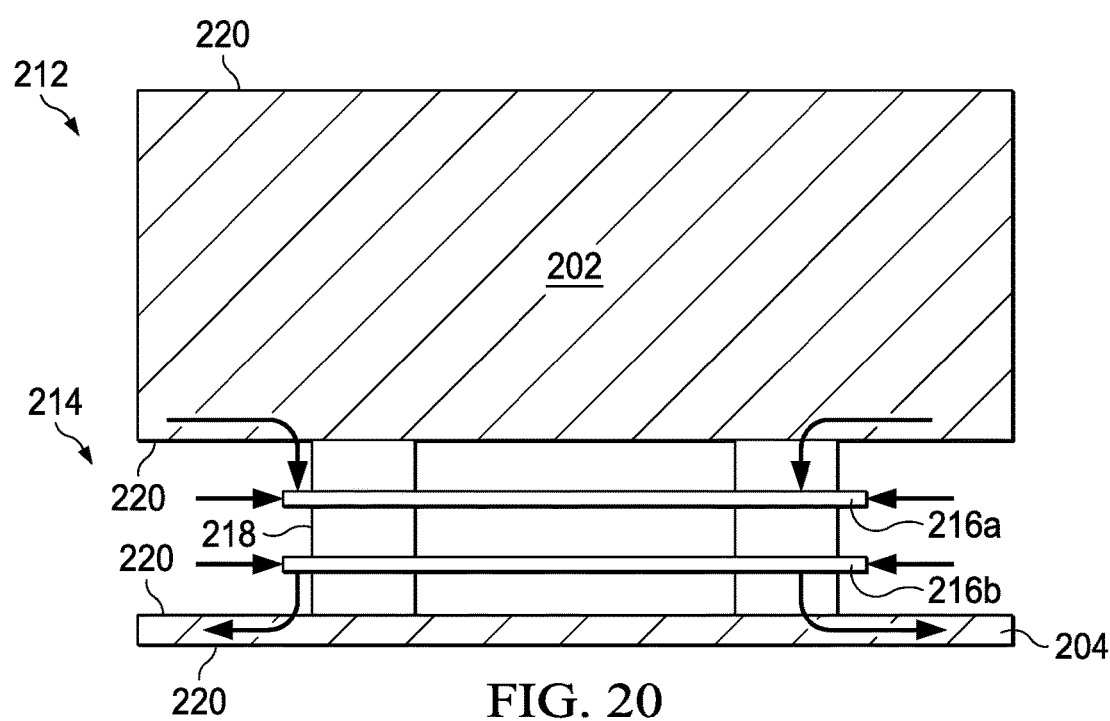
FIG. 20 is a simplified schematic diagram illustrating a block diagram view of an electronic device that includes an embodiment of a hinge, in accordance with one embodiment of the present disclosure.

Turning to FIG. 20, FIG. 20 is a simplified block diagram view of an electronic device 212 with an antenna hinge, in accordance with one embodiment of the present disclosure. Electronic device 212 can include first housing 202, second housing 204, and a capped resonance hinge 214 that rotatably couples first housing 202 to second housing 204. Capped resonance hinge 214 can be configured as a radiative hinge to allow capped resonance hinge 214 to function as an antenna for a wireless device or module. First housing 202 and second housing 204 can include conductive material 220 to allow electronic device 212 to be configured as an antenna. Capped resonance hinge 214 can include conductive rods 216a and 216b and one or more hinge blocks 218. One or more hinge blocks 218 can rotatably couple first housing 202 to second housing 204. In an example, wires can be fed through an endcap on conductive rods 216a and 216b to allow electronic device 212 to be configured as an antenna.

Figure 21:
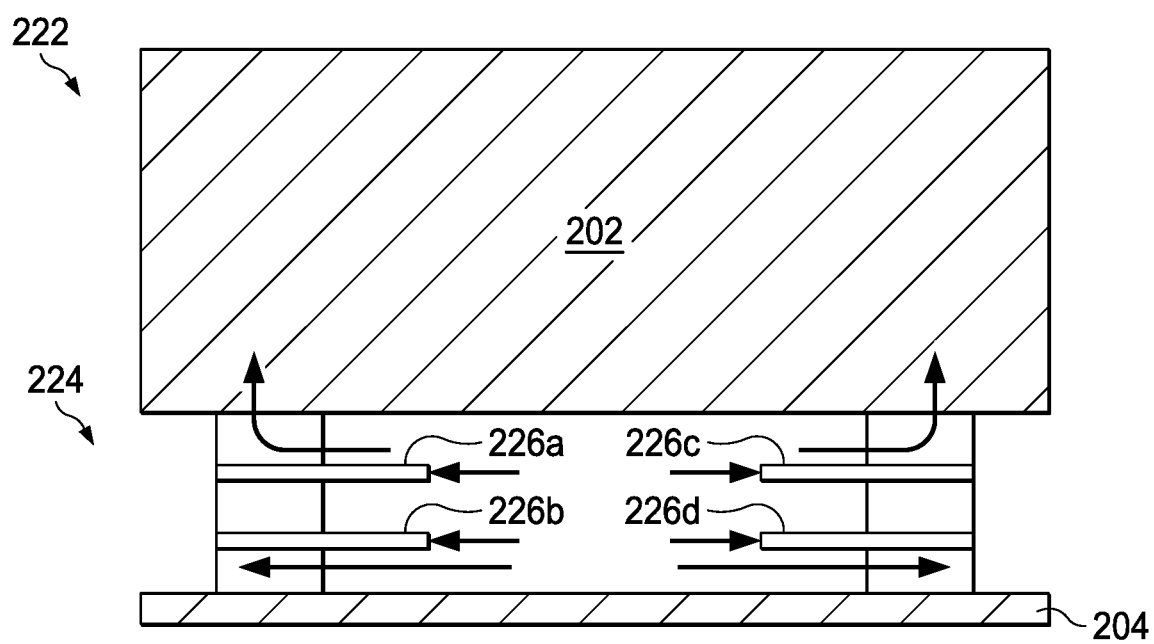
FIG. 21 is a simplified schematic diagram illustrating a block diagram view of an electronic device that includes an embodiment of a hinge, in accordance with one embodiment of the present disclosure.

Turning to FIG. 21, FIG. 21 is a simplified block diagram view of an electronic device 222 with an antenna hinge, in accordance with one embodiment of the present disclosure. Electronic device 222 can include first housing 202, second housing 204, and a feed hinge 224 that rotatably couples first housing 202 to second housing 204. First housing 202 and second housing 204 can include conductive material 220 to allow electronic device 222 to be configured as an antenna. Feed hinge 224 can include non-conductive rods 226a-226d. In an example, wires can be fed through an endcap on non-conductive rods 226a-226d to allow a resonance circuit to be created on first housing 202 and second housing 204 and allow electronic device 222 to be configured as an antenna. For example, one wire may be feed into non-conductive rod 226a and a second wire may be feed into non-conductive rode 226d to create a resonance or other circuit and allow electronic device 222 to be configured as an antenna.

Figure 22:
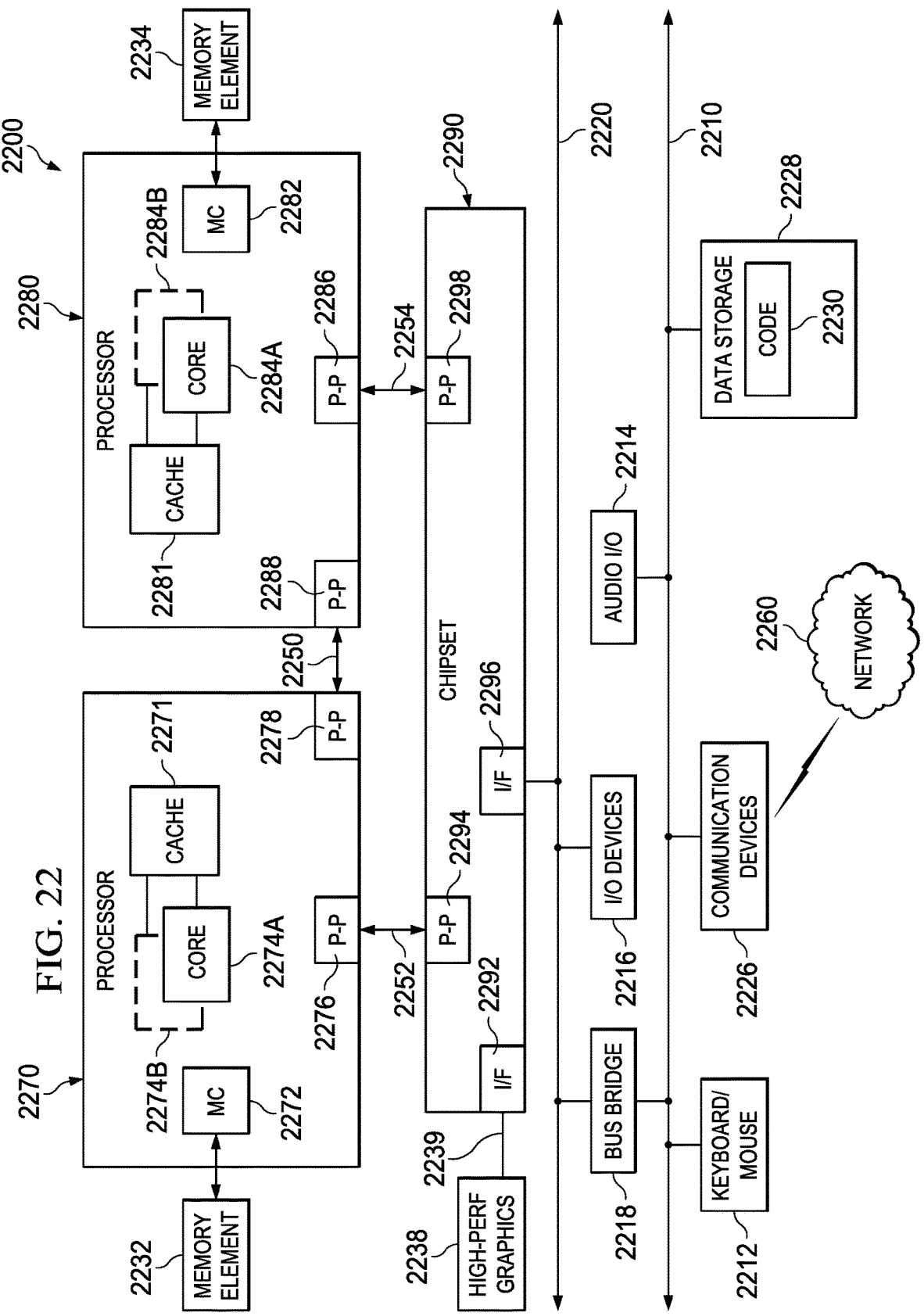
FIG. 22 is a block diagram illustrating an example computing system that is arranged in a point-to-point configuration in accordance with an embodiment.

Turning to FIG. 22, FIG. 22 illustrates a computing system 2200 that is arranged in a point-to-point (PtP) configuration according to an embodiment. In particular, FIG. 22 shows a system where processors, memory, and input/output devices are interconnected by a number of point-to-point interfaces. Generally, one or more of the network elements of electronic device 100 may be configured in the same or similar manner as computing system 2200.

As illustrated in FIG. 22, system 2200 may include several processors, of which only two, processors 2270 and 2280, are shown for clarity. While two processors 2270 and 2280 are shown, it is to be understood that an embodiment of system 2200 may also include only one such processor. Processors 2270 and 2280 may each include a set of cores (i.e., processor cores 2274A and 2274B and processor cores 2284A and 2284B) to execute multiple threads of a program. The cores may be configured to execute instruction code to facilitate a radiative hinge. Each processor 2270, 2280 may include at least one shared cache 2271, 2281. Shared caches 2271, 2281 may store data (e.g., instructions) that are utilized by one or more components of processors 2270, 2280, such as processor cores 2274 and 2284.

Processors 2270 and 2280 may also each include integrated memory controller logic (MC) 2272 and 2282 to communicate with memory elements 2232 and 2234. Memory elements 2232 and/or 2234 may store various data used by processors 2270 and 2280. In alternative embodiments, memory controller logic 2272 and 2282 may be discrete logic separate from processors 2270 and 2280.

Processors 2270 and 2280 may be any type of processor, and may exchange data via a point-to-point (PtP) interface 2250 using point-to-point interface circuits 2278 and 2288, respectively. Processors 2270 and 2280 may each exchange data with a control logic 2290 via individual point-to-point interfaces 2252 and 2254 using point-to-point interface circuits 2276, 2286, 2294, and 2298. Control logic 2290 may also exchange data with a high-performance graphics circuit 2238 via a high-performance graphics interface 2239, using an interface circuit 2292, which could be a PtP interface circuit. In alternative embodiments, any or all of the PtP links illustrated in FIG. 22 could be implemented as a multi-drop bus rather than a PtP link.

Control logic 2290 may be in communication with a bus 2220 via an interface circuit 2296. Bus 2220 may have one or more devices that communicate over it, such as a bus bridge 2218 and I/O devices 2216. Via a bus 2210, bus bridge 2218 may be in communication with other devices such as a keyboard/mouse 2212 (or other input devices such as a touch screen, trackball, etc.), communication devices 2226 (such as modems, network interface devices, or other types of communication devices that may communicate through a computer network 2260), audio I/O devices 2214, and/or a data storage device 2228. Data storage device 2228 may store code 2230, which may be executed by processors 2270 and/or 2280. In alternative embodiments, any portions of the bus architectures could be implemented with one or more PtP links.

The computer system depicted in FIG. 22 is a schematic illustration of an embodiment of a computing system that may be utilized to implement various embodiments discussed herein. It will be appreciated that various components of the system depicted in FIG. 22 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 23:
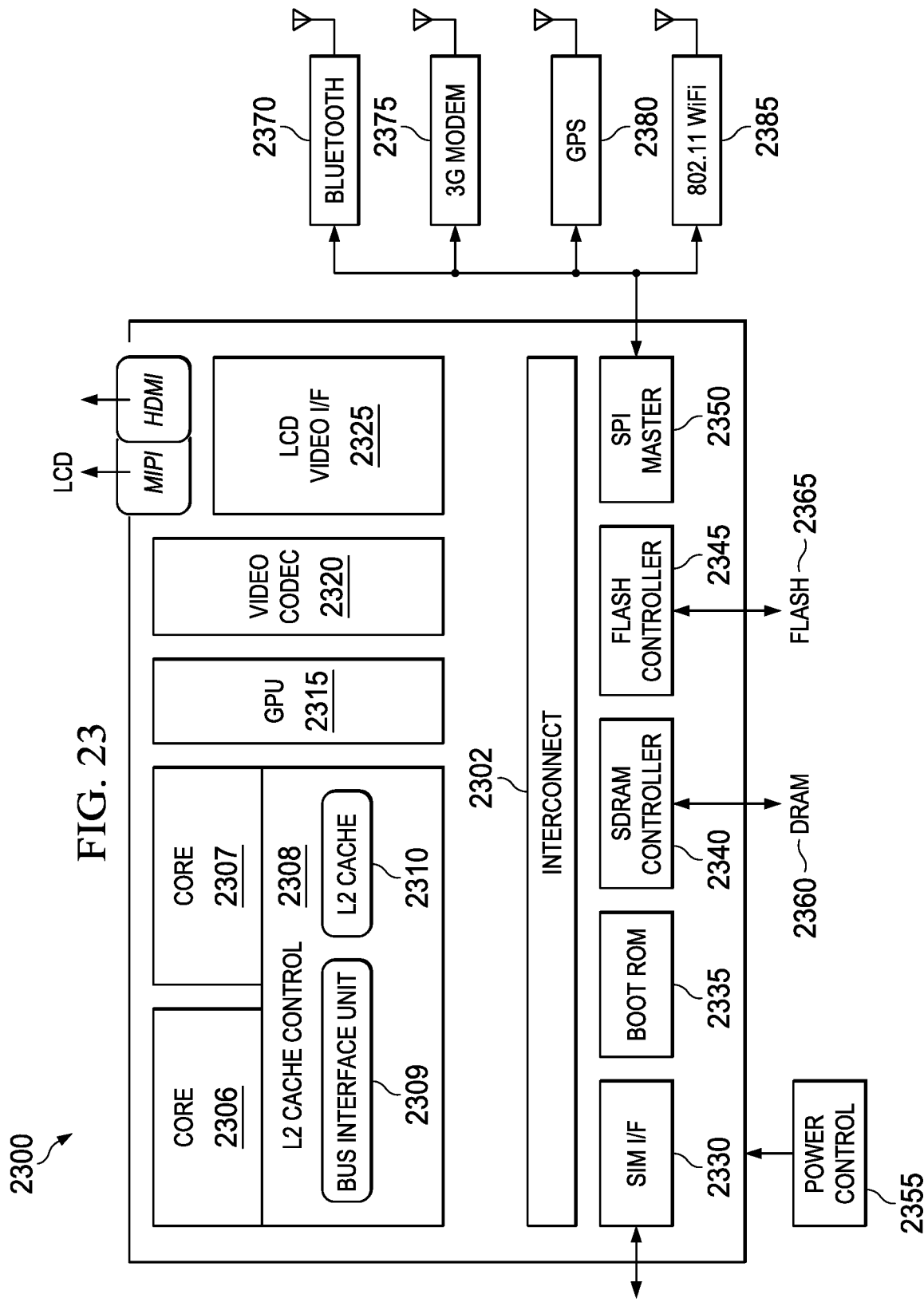
FIG. 23 is a simplified block diagram associated with an example ARM ecosystem system on chip (SOC) of the present disclosure.

Turning to FIG. 23, FIG. 23 is a simplified block diagram associated with an example ARM ecosystem SOC 2300 of the present disclosure. At least one example implementation of the present disclosure can include the radiative hinge configuration features discussed herein and an ARM component. For example, the example of FIG. 23 can be associated with any ARM core (e.g., A-7, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 23, ARM ecosystem SOC 2300 may include multiple cores 2306-2307, an L2 cache control 2308, a bus interface unit 2309, an L2 cache 2310, a graphics processing unit (GPU) 2315, an interconnect 2302, a video codec 2320, and a liquid crystal display (LCD) I/F 2325, which may be associated with mobile industry processor interface (MIPI)/high-definition multimedia interface (HDMI) links that couple to an LCD.

ARM ecosystem SOC 2300 may also include a subscriber identity module (SIM) I/F 2330, a boot read-only memory (ROM) 2335, a synchronous dynamic random access memory (SDRAM) controller 2340, a flash controller 2345, a serial peripheral interface (SPI) master 2350, a suitable power control 2355, a dynamic RAM (DRAM) 2360, and flash 2365. In addition, one or more embodiments include one or more communication capabilities, interfaces, and features such as instances of Bluetooth™ 2370, a 3G modem 2375, a global positioning system (GPS) 2380, and an 802.11 Wi-Fi 2385.

In operation, the example of FIG. 23 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 24:
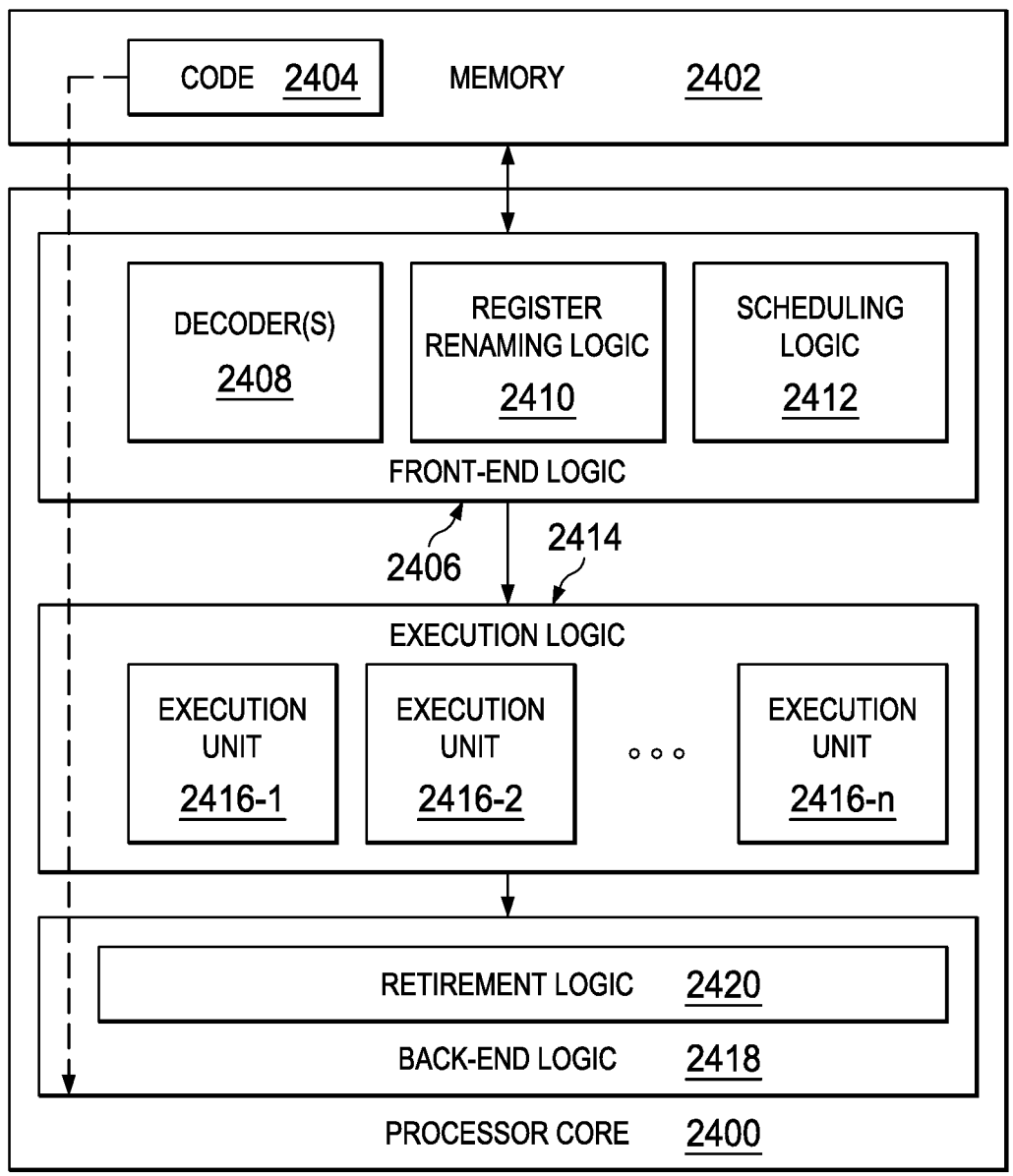
FIG. 24 is a block diagram illustrating an example processor core in accordance with an embodiment.

Turning to FIG. 24, FIG. 24 illustrates a processor core 2400 according to an embodiment. Processor core 24 may be the core for any type of processor, such as a micro-processor, an embedded processor, a digital signal processor (DSP), a network processor, or other device to execute code. Although only one processor core 2400 is illustrated in FIG. 24, a processor may alternatively include more than one of the processor core 2400 illustrated in FIG. 24. For example, processor core 2400 represents an embodiment of processors cores 2274a, 2274b, 2284a, and 2284b shown and described with reference to processors 2270 and 2280 of FIG. 22. Processor core 2400 may be a single-threaded core or, for at least one embodiment, processor core 2400 may be multi-threaded in that it may include more than one hardware thread context (or "logical processor") per core.

FIG. 24 also illustrates a memory 2402 coupled to processor core 2400 in accordance with an embodiment. Memory 2402 may be any of a wide variety of memories (including various layers of memory hierarchy) as are known or otherwise available to those of skill in the art. Memory 2402 may include code 2404, which may be one or more instructions, to be executed by processor core 2400. Processor core 2400 can follow a program sequence of instructions indicated by code 2404. Each instruction enters a front-end logic 2406 and is processed by one or more decoders 2408. The decoder may generate, as its output, a micro operation such as a fixed width micro operation in a predefined format, or may generate other instructions, microinstructions, or control signals that reflect the original code instruction. Front-end logic 2406 also includes register renaming logic 2410 and scheduling logic 2412, which generally allocate resources and queue the operation corresponding to the instruction for execution.

Processor core 2400 can also include execution logic 2414 having a set of execution units 2416-1 through 2416-N. Some embodiments may include a number of execution units dedicated to specific functions or sets of functions. Other embodiments may include only one execution unit or one execution unit that can perform a particular function. Execution logic 2414 performs the operations specified by code instructions.

After completion of execution of the operations specified by the code instructions, back-end logic 2418 can retire the instructions of code 2404. In one embodiment, processor core 2400 allows out of order execution but requires in order retirement of instructions. Retirement logic 2420 may take a variety of known forms (e.g., re-order buffers or the like). In this manner, processor core 2400 is transformed during execution of code 2404, at least in terms of the output generated by the decoder, hardware registers and tables utilized by register renaming logic 2410, and any registers (not shown) modified by execution logic 2414.

Although not illustrated in FIG. 24, a processor may include other elements on a chip with processor core 2400, at least some of which were shown and described herein with reference to FIG. 22. For example, as shown in FIG. 22, a processor may include memory control logic along with processor core 2400. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that hinge 106, antenna hinge 146, resonance hinge 206, capped resonance hinge 214, and feed hinge 224 and their teachings are readily scalable and can accommodate a large number of components, as well as more complicated/sophisticated arrangements and configurations. Accordingly, the examples provided should not limit the scope or inhibit the broad teachings of hinge 106, antenna hinge 146, resonance hinge 206, capped resonance hinge 214, and feed hinge 224 as potentially applied to a myriad of other architectures.

It is also important to note that the operations in the diagrams illustrate only some of the possible correlating scenarios and patterns that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although hinge 106, antenna hinge 146, resonance hinge 206, capped resonance hinge 214, and feed hinge 224 have been illustrated with reference to particular elements and operations that facilitate the communication process, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 172 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1 is a device that includes a first housing, a second housing, and a hinge to rotatably couple the first housing and the second housing, where the hinge is configured as an antenna.

In Example A2, the subject matter of Example A1 may optionally include where the hinge includes metal links and non-metal links and the antenna is included in an area of the hinge that includes the non-metal links.

In Example A3, the subject matter of any of the preceding 'A' Examples can optionally include where a gap between the non-metal links is used to tune the resonant frequency and bandwidth of the antenna.

In Example A4, the subject matter of any of the preceding 'A' Examples can optionally include where a length of the non-metal links is used to tune the antenna.

In Example A5, the subject matter of any of the preceding 'A' Examples can optionally include where the antenna begins in a middle portion of the hinge.

In Example A6, the subject matter of any of the preceding 'A' Examples can optionally include where the antenna begins in an end portion of the hinge.

In Example A7, the subject matter of any of the preceding 'A' Examples can optionally include where the antenna runs the length of the hinge.

Example M1 is a method that includes activating an antenna, where the antenna is included in a hinge and the hinge rotatably couples a first housing and a second housing.

In Example M2, the subject matter of any of the preceding 'M' Examples can optionally include where the hinge includes metal links and non-metal links and the antenna is included in an area of the hinge that includes the non-metal links.

In Example M3, the subject matter of any of the preceding 'M' Examples can optionally include where a gap between the non-metal links is used to tune the resonant frequency and bandwidth of the antenna.

In Example M4, the subject matter of any of the preceding 'M' Examples can optionally include where a length of the non-metal links is used to tune the antenna.

In Example M5, the subject matter of any of the preceding 'M' Examples can optionally include where the antenna begins in a middle portion of the hinge.

In Example M6, the subject matter of any of the preceding 'M' Examples can optionally include where the antenna begins in an end portion of the hinge.

In Example M7, the subject matter of any of the preceding 'M' Examples can optionally include where the antenna runs the length of the hinge.

An example system S1 can include a first housing, where the first housing includes a display, a second housing, where the second housing includes a keyboard, and a hinge to rotatably couple the first housing and the second housing, where the hinge is configured as an antenna for a wireless module.

An example system S2 can include where the hinge includes metal links and non-metal links and the antenna is included in an area of the hinge that includes the non-metal links.

In Example S3, the subject matter of any of the preceding 'SS' Examples can optionally include where a gap between the non-metal links is used to tune the resonant frequency and bandwidth of the antenna.

In Example S4, the subject matter of any of the preceding 'SS' Examples can optionally include where a length of the non-metal links is used to tune the antenna.

In Example S5, the subject matter of any of the preceding 'SS' Examples can optionally include where the antenna begins in a middle portion of the hinge.

In Example S6, the subject matter of any of the preceding 'S' Examples can optionally include where the antenna begins in an end portion of the hinge.

Example X1 is a machine-readable storage medium including machine-readable instructions to implement a method or realize an apparatus as in any one of the Examples A1-A7, and M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

The invention claimed is:

1. A device, comprising:
a first housing;
a second housing;
a wireless module;
conductors that extend from the wireless module and are at least a portion of an antenna for the wireless module;
a hinge to rotatably couple the first housing and the second housing, wherein the hinge includes metallic links and non-metallic links; and
rods that extend along at least a portion of a length of the hinge that includes the non-metallic links, wherein the conductors extend inside the rods.

2. The device of claim 1, wherein a gap between the non-metal links is used to tune a resonant frequency and bandwidth of the antenna.

3. The device of claim 1, wherein a length of the non-metal links is used to tune the antenna.

4. The device of claim 1, wherein the antenna begins in a middle portion of the hinge.

5. The device of claim 1, wherein the antenna begins in an end portion of the hinge.

6. The device of claim 1, wherein the antenna runs the length of the hinge.

7. The device of claim 1, wherein the rods and the conductors inside the rods extend through the non-metallic links.

8. A method, comprising:
activating an antenna, wherein the antenna is included in a hinge and the hinge rotatably couples a first housing and a second housing, wherein the hinge includes metallic links and non-metallic links, wherein rods extend along at least a portion of a length of the hinge that includes the non-metallic links, wherein conductors extend inside the rods and the conductors are configured as at least a portion of the antenna.

9. The method of claim 8, wherein a gap between the non-metal links is used to tune a resonant frequency and bandwidth of the antenna.

10. The method of claim 8, wherein a length of the non-metal links is used to tune the antenna.

11. The method of claim 8, wherein the antenna begins in a middle portion of the hinge.

12. The method of claim 8, wherein the antenna begins in an end portion of the hinge.

13. The method of claim 8, wherein the antenna runs the length of the hinge.

14. The method of claim 8, wherein the rods and the conductors inside the rods extend through the non-metallic links.

15. A system, comprising:
a first housing, wherein the first housing includes a display;
a second housing, wherein the second housing includes a keyboard;
a wireless module; and
a hinge to rotatably couple the first housing and the second housing, wherein the hinge includes metallic links and non-metallic links, wherein rods extend along at least a portion of a length of the hinge that includes the non-metallic links, wherein conductors extend inside the rods and the conductors are configured as at least a portion of an antenna for the wireless module.

16. The system of claim 15, wherein a gap between the non-metal links is used to tune a resonant frequency and bandwidth of the antenna.

17. The system of claim 15, wherein a length of the non-metal links is used to tune the antenna.

18. The system of claim 15, wherein the antenna begins in a middle portion of the hinge.

19. The system of claim 15, wherein the antenna begins in an end portion of the hinge.

20. The system of claim 15, wherein the rods and the conductors inside the rods extend through the non-metallic links.

* * * * *